(12) United States Patent
Bruell et al.

(10) Patent No.: US 11,518,505 B1
(45) Date of Patent: *Dec. 6, 2022

(54) VERTICAL TAKE-OFF AND LANDING (VTOL) TILT-WING PASSENGER AIRCRAFT

(71) Applicant: Transcend Air Corporation, Carlisle, MA (US)

(72) Inventors: Gregory O. Bruell, Rancho Santa Fe, CA (US); Peter H. Schmidt, Lexington, MA (US)

(73) Assignee: Transcend Air Corporation, Carlisle, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,240

(22) Filed: Jun. 28, 2021

Related U.S. Application Data

(63) Continuation of application No. 16/449,774, filed on Jun. 24, 2019, now Pat. No. 11,077,937.

(60) Provisional application No. 62/689,028, filed on Jun. 22, 2018.

(51) Int. Cl.
| | |
|---|---|
| *B64C 27/28* | (2006.01) |
| *B64C 11/00* | (2006.01) |
| *B64C 3/38* | (2006.01) |
| *B64C 3/14* | (2006.01) |
| *B64C 1/14* | (2006.01) |
| *B64C 27/00* | (2006.01) |
| *B64C 25/32* | (2006.01) |
| *B64C 1/00* | (2006.01) |

(52) U.S. Cl.
CPC ............... *B64C 27/28* (2013.01); *B64C 1/14* (2013.01); *B64C 3/14* (2013.01); *B64C 3/38* (2013.01); *B64C 11/001* (2013.01); *B64C 25/32* (2013.01); *B64C 27/006* (2013.01); *B64C 2001/0072* (2013.01); *B64C 2001/0081* (2013.01); *B64C 2003/146* (2013.01); *B64C 2003/147* (2013.01)

(58) Field of Classification Search
CPC ..... B64C 29/0033; B64C 3/385; B64C 27/28; B64C 1/14; B64C 3/14; B64C 11/001; B64C 27/006; B64D 35/04
See application file for complete search history.

(56) References Cited

U.S. PATENT DOCUMENTS

| | | | | |
|---|---|---|---|---|
| 2,362,224 | A * | 11/1944 | Roseland | B64C 3/38 244/48 |
| 3,035,789 | A * | 5/1962 | Young | B64C 29/0033 244/7 C |
| 2018/0057157 | A1* | 3/2018 | Groninga | B64C 39/008 |
| 2019/0256190 | A1* | 8/2019 | Olson | B64C 29/0033 |

\* cited by examiner

*Primary Examiner* — Richard R. Green
*Assistant Examiner* — Ashesh Dangol
(74) *Attorney, Agent, or Firm* — Clocktower Law LLC; Erik J. Heel; Michael A. Bartley

(57) ABSTRACT

Disclosed herein is a VTOL tilt-wing aircraft that serves as a 4-6 passenger airliner for scheduled service between city centers and that is optimized for travel distances from 100-500 miles fully loaded with passengers and fuel. The VTOL aircraft solves technical, cost, and time problems inherent in other forms of transportation, including, but not limited to, rail, passenger airlines, and helicopters. The VTOL aircraft (1) takes off and lands like a helicopter, (2) flies fast like a jet, and (3) costs less than or comparable to a helicopter.

3 Claims, 31 Drawing Sheets

VERTICAL TAKE-OFF AND LANDING (VTOL) TILT-WING PASSENGER AIRCRAFT

CROSS-REFERENCE TO RELATED APPLICATIONS

This utility patent application is a continuation of U.S. patent application Ser. No. 16/449,774, filed Jun. 24, 2019, titled "Vertical Take-Off And Landing (VTOL) Tilt-Wing Passenger Aircraft", naming inventors Gregory O. Bruell and Peter H. Schmidt, which claims priority from U.S. provisional patent application Ser. No. 62/689,028, filed Jun. 22, 2018, titled "Vertical Take-Off And Landing (VTOL) Tilt-Wing Passenger Aircraft", naming inventors Gregory O. Bruell and Peter H. Schmidt.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2021 Transcend Air Corporation.

BACKGROUND

Field of Technology

This relates to Vertical Take-Off And Landing (VTOL) aircraft, and more specifically to VTOL tilt-wing passenger aircraft.

Background

The first commercially successful jet passenger aircraft was the British de Havilland Comet, which first flew in 1949 and ended service in 1997 (www.wikipedia.org/wiki/De_Havilland_Comet). While jet aircraft travel at high rates of speed, they require long runways to take off and land, and they are expensive to operate. The first mass-produced helicopter was the Sikorsky R-4, which was produced from 1942 to 1944, primarily for the militaries of the United States and the United Kingdom (www.wikipedia.org/wiki/Sikorsky_R-4). While helicopters can take off and land vertically, i.e. without dedicated runways, they travel at low rates of speed, and they are expensive to operate.

Since the successful commercialization of jet aircraft and helicopters, there has been a need for a passenger aircraft that combines the speed of a jet aircraft with the Vertical Take-Off And Landing (VTOL) capabilities of a helicopter, while also achieving commercial success by managing total life-cycle cost, including the cost of certification, manufacturing, and operating.

Starting in the 1960s, inventors invented various aircraft capable of vertical take-off and/or landing. These aircraft varied in many ways, including, but not limited to, engine type (jet, propeller, and/or prop-rotor), engine power source (jet fuel, aviation gas, or electric), engine count (one or multiple), engine location, wing count (one or multiple), VTOL design (tilt-rotor, tilt-wing, a combination thereof, or other), wing design, fuselage design, personnel capacity (one or multiple), aesthetics, range, and commercial viability.

In 2002, Oliver Garrow founded Garrow Aircraft, which developed a series of eight flying prototype VTOL aircraft. The aircraft explored a variety of VTOL configurations, including tilt-rotor, fan-in-wing, ducted-fan, multi-copter, and boxwing-plus-tilt-wing.

In 2013, Gregory O. Bruell and Oliver Garrow co-founded Elytron Aircraft LLC (Elytron), which developed additional prototype VTOL aircraft, building on the work Garrow had previously done. These included a 2,000 pound, manned, gasoline-engine-powered boxwing-plus-tilt-wing aircraft, and a 1:5 scale prototype of a five seat boxwing-plus-tilt-wing passenger aircraft.

On 2016 Jun. 6, an article by ADB Safegate (blog.adbsafegate.com/together-we-power-your-airport-performance/) reported: "Airport traffic has doubled every 15 years since the 1970s, and will most likely double again within the next 15 years. [ . . . ] The constantly growing demand for air traffic is nothing new, but the airport industry has reached the point where the most obvious solution—to expand through building new infrastructure—is no longer possible [ . . . ] due to geographical and environmental restrictions." This report suggests that the commercial aviation industry will not be able to build new airports and runways fast enough to keep up with passenger demand.

On 2016 Dec. 12, the Federal Aviation Administration (FAA) rewrote the regulations (known as Part 23) for certifying small aircraft. On 2017 Aug. 30, the new rule went into effect (14 CFR 23.10, now numbered 14 CFR 23.2010). The full 550-page rule is on the FAA's website (www.faa.gov/regulations_policies/rulemaking/recently_published/media/Part23_FinalRule_2120-AK65_WebCopy.pdf). The reformed, revised, and rewritten Part 23 has the practical effect of reducing certification cost and time by approximately 50% for small aircraft, including qualifying VTOL aircraft.

DESCRIPTION OF PRIOR ART

U.S. Patents

U.S. Pat. No. 3,035,789 (issued 1962 May 22, name Arthur M Young, title "Convertiplane") is classified as "Aircraft capable of landing or taking-off vertically having its flight directional axis horizontal when grounded the lift during taking-off being created by free or ducted propellers or by blowers the propellers being tiltable relative to the fuselage."

U.S. Pat. No. 3,107,882 (issued 1963 Oct. 22, name Frederick H Matteson & Joseph Stuart III, title "Yaw Control System For VTOL Tilt Wing Aircraft") is classified as "Aircraft capable of landing or taking-off vertically having its flight directional axis horizontal when grounded the lift during taking-off being created by free or ducted propellers or by blowers the propellers being tiltable relative to the fuselage."

U.S. Pat. No. 3,136,499 (issued 1964 Jun. 9, name James R Kessler, title "Aircraft Power Transmission System") is classified as "Aircraft capable of landing or taking-off vertically having its flight directional axis horizontal when grounded the lift during taking-off being created by free or ducted propellers or by blowers the propellers being tiltable relative to the fuselage."

U.S. Pat. No. 3,141,633 (issued 1964 Jul. 21, name James K L MacKay, title "Tilt-Wing Aircraft") is classified as "Aircraft capable of landing or taking-off vertically having its flight directional axis horizontal when grounded the lift during taking-off being created by free or ducted propellers or by blowers the propellers being tiltable relative to the fuselage."

U.S. Pat. No. 5,141,176 (issued 1992 Aug. 25, name Robert W. Kress & David F. Gebhard, title "Tilt Wing VTOL Aircraft") discloses, in the Abstract, "A tilt wing VTOL aircraft has an upper wing with a leading edge, a trailing edge, an inboard area adjacent the fuselage, spaced opposite end tip areas and an upper surface. The wing is pivotally mounted on the fuselage for rotation from a cruise position in which the upper surface of the wing is flush with the upper surface of the fuselage to a hover position in which the wing is perpendicular to the upper surface of the fuselage. The wing has a forward portion in the leading edge of the inboard area affixed to the fuselage and cut out of the wing and an aft portion in the trailing edge of the inboard area affixed to the fuselage and cut out of the wing. Thus, when the wing is in its cruise position it is whole, including the forward and aft portions, whereas when the wing is in its hover position it has a forward cutout at its leading edge in the inboard area corresponding to the forward portion and an aft cutout at its trailing edge in the inboard area corresponding to the aft portion so that the spanwise wing lift distribution is diminished when the wing is in a position other than its cruise position. The forward and aft cutouts produce a vortex along the sides of the fuselage which results in the spanwise wing lift distribution being diminished when the wing is in a position other than its cruise position. This vortex increases the wing tolerance to angle of attack and thus reduces the requirement for propeller bending of the air flow during mid-transition speeds. It also reduces the intensity of center section buffet."

U.S. Pat. No. 5,405,105 (issued 1995 Apr. 11, name Robert W. Kress, title "Tilt Wing VTOL Aircraft") discloses, in the Abstract, "A tilt wing VTOL aircraft has a fuselage with sides and an upper surface, an upper wing having a leading edge, a trailing edge, a chord, a lower surface and an upper surface. The wing is pivotally mounted on the fuselage for rotation from a cruise flight position in which the upper surface of the wing is flush with the upper surface of the fuselage to a hover position in which the wing is perpendicular to the upper surface of the fuselage. Aircraft engines are mounted on the wing. The aircraft has a pair of flaps at the trailing edge of the wing, each located between the fuselage and an engine and each spaced the same distance from the fuselage and each of the engines. The flaps are mounted for selective movement from collinearity with the chord of the wing to a first angle of about +30° with the chord and about 30° with the upper surface of the wing and to a second angle of about −30° with the chord and about 30° with the lower surface of the wing. When the flaps are between a small angle with the chord and the first angle with the chord, the aircraft moves in a forward horizontal direction while in hover and when the flaps are between a small angle with the chord and at the second angle with the chord, the aircraft moves in a reverse horizontal direction while in hover. The horizontal motion forces are produced by the propeller slipstream acting on the wing flaps and because the flap aerodynmnic [sic] center of gravity is at essentially the same height as the aircraft center of gravity."

U.S. Pat. No. 5,839,691 (issued 1998 Nov. 24, name Jean Soulez Lariviere, title "Vertical Takeoff And Landing Aircraft") discloses, in the Abstract, "A vertical takeoff and landing aircraft has a fuselage with a wing located above the fuselage at the rearward end and with a horizontal stabilizer located at the forward end. The propellers are mounted on booms separate from the wings and located just behind the center of gravity of the aircraft. The propellers are pivotable between horizontal and vertical axes and brakes are provided to allow locking of propeller position. When the brakes are released, the propellers automatically pivot between vertical and horizontal orientations and vice-versa based upon control of the aircraft by the pilot."

U.S. Pat. No. 6,030,177 (issued 2000 Feb. 29, name Lee N. Hager, title "Drive System For A Variable Diameter Tilt Rotor") discloses, in the Abstract, "A drive system for a variable diameter rotor system that includes a plurality of rotor blade assemblies with inner and outer blade segments. The outer blade segment being telescopically mounted to the inner blade segment. The drive system engaging a jackscrew for telescoping the outer blade segment with respect to the inner blade segment. The drive system includes a rotor hub that is pivotally mounted to the upper end of a main rotor shaft about a pivot point. A gimbaled bearing is disposed between and attached to the main rotor shaft and the rotor hub. The gimbaled bearing permits the rotor hub to pivot about the pivot point. A blade actuation shaft is concentrically disposed within the main rotor shaft. The blade actuation shaft has a constant velocity joint pivotally attached to its upper end about the pivot point. A planetary gearset engages the blade actuation shaft with the jackscrew. The planetary gearset includes a sun gear that is attached to the housing and a ring gear that is attached to the rotor hub. A plurality of pinion gears are disposed between and intermesh with the sun gear and the ring gear. The pinion gears are rotatably mounted to a pinion cage which, in turn, is rotatable with respect to the housing and the ring gear. A lower hypoid bevel gear is rotatably driven by the pinion gears and adapted to intermesh with an output pinion on the jackscrew."

U.S. Pat. No. 7,753,309 (issued 2010 Jul. 13, name Oliver Garreau, title "VTOl/STOL TILT-PROP FLYING WING") discloses, in the Abstract, "An aircraft comprises two wings, a fuselage, a tail planform and a pair of counter-rotating propellers. The two wings are located at a longitudinal center of gravity of the aircraft. The fuselage is located forward of the longitudinal center of gravity and coupled to the two wings. The tail planform is coupled to the two wings and located aft of the longitudinal center of gravity. The pair of counter-rotating propellers are located at the longitudinal center of gravity and between the wings. Further, the pair are coupled to a tilting mechanism for tilting the propellers between a vertical flight position and a forward flight position. One of the propellers located beneath the wings when in the vertical flight position and one of the propellers is located above the wings when in the vertical flight position." This patent has been licensed to Transcend Air Corporation (hereinafter Transcend).

U.S. Pat. No. D665,333 (issued 2012 Aug. 14, name Oliver Garreau, title "Aircraft") discloses, in the Claim, "the ornamental design for a VTOL aircraft, as shown and described." This patent has been licensed to Transcend. This patent does have a single hull; all-electric actuation; no mechanical control cables; and no complex tilting tail.

U.S. Pat. No. D724,001 (issued 2015 Mar. 10, name Oliver F. Garreau, title "Joined-Wing Tilt-Wing Aircraft") discloses, in the Claim, "The ornamental design for a joined-wing, tilt-wing aircraft, as shown and described." This patent has been licensed to Transcend. This patent does have a single hull; all-electric actuation; no mechanical control cables; no complex tilting tail; an intelligent electronic flight control system that keeps aircraft flying within its certificated flight envelope; a fly-by-wire electronic flight control system; flight into known icing (FIKI) capability; pressurization; the capability of flying in all four directions while in helicopter mode; a high rate of climb to over 20,000 feet while in helicopter mode; and a whole-airframe parachute.

U.S. Pat. No. 9,499,266 (issued 2016 Nov. 22, name Oliver Garreau, title "Five-Wing Aircraft To Permit Smooth Transitions Between Vertical And Horizontal Flight") discloses, in the Abstract, "A five-wing aircraft transitions smoothly between vertical and horizontal flight modes, and enhances pitch neutrality of the aircraft when in flight at all speeds to improve flight efficiency. The aircraft includes a fuselage, a fixed wing assembly coupled to the fuselage and having a front fixed wing and a rear fixed wing, the front fixed wing coupled to the front portion of the fuselage and the rear fixed wing coupled to the rear portion of the fuselage, the front fixed wing and rear fixed wing being connected together by winglets, a tilt-wing pivotably mounted to the central portion of the fuselage, and a pair of rotary wings coupled to the tilt-wing. The tilt-wing pivotably adjusts to permit the aircraft to transition smoothly between vertical and horizontal flight. The rotary wings generate thrust or lift depending on the orientation of the tilt-wing." This patent has been licensed to Transcend. This patent does have a single hull; all-electric actuation; no mechanical control cables; and no complex tilting tail.

Foreign Patent Documents

International Patent Application Publication WO2017200610 (published 2017 Nov. 23, name Rodin Lyasoff & Geoffrey C. Bower & Zachary Lovering, title "Self-Piloted Aircraft For Passenger Or Cargo Transportation") discloses, in the Abstract, "The present disclosure pertains to self-piloted, electric vertical takeoff and landing (VTOL) aircraft that are safe, low-noise, and cost-effective to operate for cargo-carrying and passenger-carrying applications over relatively long ranges. A VTOL aircraft has a tandem-wing configuration with one or more propellers mounted on each wing to provide propeller redundancy, allowing sufficient propulsion and control to be maintained in the event of a failure of any of the propellers or other flight control devices. The arrangement also allows the propellers to be electrically-powered, yet capable of providing sufficient thrust with a relatively low blade speed, which helps to reduce noise. In addition, the aircraft is aerodynamically designed for efficient flight dynamics with redundant controls for yaw, pitch, and roll." This publication does have all-electric actuation; no complex rotorheads or swashplates; no hydraulics; no fuel lines; no mechanical control cables; no complex cross-shafting among engines and propellers or rotors; no need to certify acceptable arrival and departure stall behavior; no need to certify spin recovery; intelligent electronic flight control that keeps aircraft flying within is certificated flight envelope; a fly-by-wire electronic flight control system; is capable of being safely operated by a single pilot; is optionally piloted; a massively redundant flight control system; an electric drive train; electric power with electric drive train; advanced navigation sensors; can be self-flying; detects and avoids collisions with terrain, obstacles, and other aircraft; implements sensor fusion to aid navigation; is capable of flying in all four directions while in helicopter mode; is capable flying with a level cabin in all flight modes; and is equipped with a whole-airframe parachute.

Non-Patent Literature

Other companies are pursuing the Transformative Vertical Flight (TVF) opportunity. This is a rapidly developing space. Larry Page (co-founder of Google) has funded two startups with $100M (www.forbes.com/sites/briansolomon/2016/06/09/googles-larry-page-is-spending-100-million-to-build-flying-cars/#1d8f90932850), including Cora (FKA Zee.Aero) (www.cora.aero) and Kitty Hawk (www.kittyhawk.aero). Airbus has funded a Silicon Valley-based effort with $150M (www.airbus.com/newsroom/press-releases/en/2016/01/20160117_airbus_group_silicon_valley.html).

Uber is working to foster an entire ecosystem around their vision for and within-city, electric-only "Urban eVTOL" (www.compositesworld.com/news/aurora-introduces-new-evtol-aircraft-flying-taxi-). Uber's all-electric approach, however, requires breakthroughs in fundamental battery physics, which have not yet been achieved.

The trends are clear. The aviation congestion problem is worsening in mega cities worldwide, and a novel TVF service offering is bound to be part of the solution to the problem.

None of the above approaches, however, provides an aircraft that (1) takes off and lands like a helicopter, (2) flies fast like a jet, and (3) costs comparable to or less than a helicopter. What is needed, therefore, is an aircraft that overcomes the above-mentioned limitations and that includes the features and advantages enumerated above.

BRIEF SUMMARY

Disclosed herein is a VTOL tilt-wing aircraft that serves as a 4-6 passenger airliner for scheduled service between city centers and that is optimized for travel distances from 100-500 miles fully loaded with passengers and fuel. The VTOL aircraft solves technical, cost, and time problems inherent in other forms of transportation, including, but not limited to, rail, passenger airlines, and helicopters. The VTOL aircraft (1) takes off and lands like a helicopter, (2) flies fast like a jet, and (3) costs comparable to or less than a helicopter.

Current tiltrotor aircraft, such as the Bell Boeing V-22 Osprey military aircraft (www.wikipedia.org/wiki/Bell_Boeing_V-22_Osprey) and the AgustaWestland AW609 civil variant (www.wikipedia.org/wiki/AgustaWestland_AW609) are complex and expensive. The VTOL aircraft disclosed herein, the Transcend Vy 400 (Vy 400), on the other hand, is a tilt-wing aircraft that is simple and efficient, with disruptive economics from a novel integration of technology advancements, especially the use of a BRS Aerospace whole airframe parachute (brsaerospace.com/). The Vy 400 is optimized for longer trips (city-to-city), unlike other VTOLs that are aimed at short hop (within-city) use. The Vy 400 is designed to be converted to all-electric when battery breakthroughs happen. The Vy 400 aircraft makes helicopters obsolete for VIP travel and frees all travelers from traffic jams and airport security.

Features and Advantages

Mission-Specific Features: Primary
Wing tilt mechanism. The wing tilt mechanism makes the Vy 400 a tilt-wing aircraft, as opposed to tiltrotor aircraft.

The mechanism is space saving, reducing impingement of space on the main cabin. The mechanism employs an optimum design that doesn't generate damaging transient loads on failure.

Metamaterial-based sound dampening for cabin. The aircraft design in some embodiments makes use of engineered materials (acoustic metamaterials en.wikipedia.org/wiki/Acoustic_metamaterial), such as those under development by ZAL Center of Applied Aeronautical Research (acousticmetamaterial.com/partners/) and others, that are constructed with mathematically optimized shaped micro-scale structural features engineered to absorb, reflect, or refract sound waves generated by the aircraft so that the pilot and passengers experience reduced sound levels inside the aircraft.

Blade-morphing technology. As VTOL aricraft gain speed and travel through the transition corridor (i.e. to/from vertical/horizontal flight), there are significant loading issues on both the propellers and gearbox. The Vy 400 uses propeller blades designed by FlexSys (www.flxsys.com). The FlexSys adaptive blades morph during operation, thereby reducing overall stress on the blades and gearbox (www-personal.umich.edu/-adriaens/Site/UM_CleanTech_files/Kota.pdf). With VTOL aircraft, there are design trade-offs between speed and hover efficiency of the propellers that are based on propeller disk size, chord, and twist. By employing blade-morphing technology, the Vy 400 changes the twist and the disk size, as required, during each rotation, without the complexity that is inhering in a helicopter hub.

Consumer Physics PIR water-in-fuel sensor. The Vy 400 uses a water-in-fuel sensor subsystem designed by Consumer Physics (www.consumerphysics.com/business/embed-scio/). This advanced subsystem is interfaced to the flight control system such that the aircraft can determine when fuel is potentially or actually contaminated by water, and take appropriate, situation specific actions, such as alerting ground crew, the pilot, the remote pilot, or possibly initiating precautionary measures such as a precautionary landing or deployment of the aircraft parachute.

Fully automated preflight. Preflight procedures on the Vy 400 are fully automated, including moving and testing of all control surfaces.

Mission-Specific Features: Secondary

Non-wheeled landing gear. The Vy 400 uses retractable landing gear. In some embodiments, it consists of gear legs with a non-slip footpad, two in the rear, one in the front. In other embodiments, it consists of helicopter-style skids that are skinned, which helps direct airflow when close to the ground in order to enhance low-level controllability. Having no wheels reduces weight and complexity.

Vertical flight control. The Vy 400 achieves vertical flight control with standard flight control surfaces on the main wing and variable pitch propellers. The Vy 400 does not use helicopter-style cyclics, thereby reducing both complexity and cost.

Single centralized primary fuel tank. Most aircraft have two wings each containing fuel tanks, with fuel lines routed through the aircraft to the engine(s). The Vy 400, on the other hand, does not have fuel tanks in the wing, instead having a single centralized primary fuel tank in the rear section of the fuselage, thereby reducing all of complexity, cost, and risk of fire.

Electric anti-icing. The Vy 400 uses electric anti-icing for flight into known icing (FIKI), thereby eliminating the need for an additional fluid management system for de-icing/anti-icing fluid.

Combined data and power bus. The Vy 400 uses a doubly redundant combined data and power bus for all electronics on aircraft based on time-division multiple access—(TDMA). Using ethernet with high wattage power over ethernet reduces both complexity and cost.

Dual redundant high power buses. The Vy 400 uses two high power buses for the actuators, gear, and tilt mechanism.

Loading independent of center of gravity. The Vy 400 loading is not dependent on center-of-gravity (CG) based loading requirements, which reduces operational complexity, and which means that the passengers' weights do not need to be taken into consideration when assigning seats.

Carbon fiber and/or aluminum. The Vy 400 can be manufactured with carbon fiber, aluminum, or both.

Optionally piloted. Since flight control is fully automated, the on-board pilot is optional. When the "pilot's seat" is switched to a passenger's seat, cost is also flipped to revenue.

Secure datalinks. The Vy 400 has secure datalinks that are separated from passenger entertainment systems.

Fuel tanks. The Vy 400 has a primary fuel tank that is crash resistant and a secondary fuel tank that gravity feeds to the engine.

Split cabin door. The Vy 400 has a split cabin door that enables occupants to open just the top of the door, so that in case of ditching in water the fuselage is more likely to avoid flooding.

Emergency door. An emergency door is on the opposite side of the cabin from the main door.

Lightning protection. The Vy 400 is designed to meet certification standards for lightning resistance using conventional industry techniques for aluminum or carbon-fiber hulled aircraft that redirect lighting strokes away from critical systems, protecting the aircraft and occupants.

Frangible hull. The Vy 400 has a frangible hull with energy absorbing seats and restraints.

Fire-resistant cabin interior. The Vy 400 uses the latest fire-resistant materials in all of its interior furnishings so that it meets or exceeds all applicable international safety standards. Augmented reality. The Vy 400 includes an augmented reality helmet for the pilot (or for another occupant when not piloted) that makes use of external cameras to make the hull of the aircraft invisible.

Advantages Over Conventional Air Travel

Traveling from the New York Stock Exchange to the Boston Board of Trade by commercial airline take five hours door-to-door, broken down as follows:
  40 minutes—padding
  20 minutes—walking
  30 minutes—Uber to airport
  30 minutes—TSA security check
  15 minutes—boarding
  15 minutes—taxiing
  40 minutes—flying
  35 minutes—taxiing
  15 minutes—deplaning
  60 minutes—Uber from airport With the Transcend Vy 400, all but flying and walking are eliminated, with the entire trip taking only one hour:
  20 minutes—walking
  40 minutes—flying Advantages Over Helicopters The Vy 400 has many advantages over helicopters, including, but not limited to, the following:
  1. Top speed of over 405 mph, which allows for a trip time of 36 minutes from downtown New York to downtown Boston, for example. This is approximately three times faster than flying by helicopter.

2. Half the operating costs of helicopters due to simplified mechanism of vertical operation (e.g. no helicopter rotor hub) and due to the high speed reducing time required to accomplish travel vs inherently slower helicopters.

3. Whole airframe parachute.

4. Health and usage monitoring (HUMS).

5. Electric anti-icing.

6. Single engine driving both props through gearboxes or through use of electric motors.

7. Fly-by-wire flight control system:
   a. Dual channel.
   b. N-Plex modular redundant.
   c. Mission protection.

Advantages Over Short Hop VTOLs

The Transcend Vy 400 has many advantages over short hop VTOLs, including, but not limited to, the following:

1. Proven jet engine and jet fuel power that does not require breakthroughs in battery technology that may not ever occur, or which may occur at an unpredictable time in the future.

2. City-to-city range.

3. Cruise speeds that are three to five times faster.

Advantages Over Planes, Trains, and Automobiles

The Transcend Vy 400 has many advantages over planes, trains, and automobiles (and other forms of transportation), including, but not limited to those enumerated in the following table:

Advantage: Safety

The Vy 400 is safe and includes the following safety features:

1. Whole airframe parachute manufactured by BRS Aerospace (www.brsaerospace.com).

2. Health and usage monitoring (HUMS) integrated into the flight control system, making use of standard sensors including but not limited to accelerometers, piezo-electric strain gauges, microphones, cameras, and laser scanners.

3. Flight into known icing (FIKI).

4. Mission protection.

Advantage: Value

The value advantage is a combination of acquisition cost of aircraft, operating cost of aircraft, per-passenger cost of trip, and time of trip.

Using the popular Boston-to-New-York-City corridor as an example, it currently costs passengers $907 to fly on a Bell 407 helicopter, and the trip takes about one hour and forty-five minutes (1:45). On the Transcend Vy 400, the same trip costs $449, and the trip takes about thirty-six minutes (0:36), saving passengers about $458 in cost and about one hour and nine minutes (1:09) in time.

A Bell 407GXP helicopter costs about $3.1 million (www.bjtonline.com/aircraft/bell-407gxp). A Leonardo AW609 Tiltrotor aircraft costs about $25 million (www.airway1.com/worlds-first-civil-tilt-rotor-aw609-has-started-production). The Transcend Vy 400 costs about $3.5 million, more than but comparable to a similarly-sized helicopter and much less than a tiltrotor.

|  | Airlines | Helicopters | High Speed Trains | Hyperloop | Self-Driving Cars | Electric Flying Cars | Vy400 |
| --- | --- | --- | --- | --- | --- | --- | --- |
| Mission | city-to-city | city-to-city, within city | city-to-city | city-to-city | city-to-city within city | within city | city-to-city |
| Range | 150-8,000 miles | 5-500 miles | 50-1,500 miles | 25-400 miles | 1-300 miles | 5-100 miles | 50-450 miles |
| Door To Door Speed | 40-400 mph | 30-165 mph | 47-171 mph | 60-300 mph | 5-60 mph | 10-120 mph | 110-315 mph |
| NY-Boston Door To Door Time | 5 hrs | 2.3 hrs | 4.3 hrs | 1.1 hr | 5 hrs | x | 1 hr |
| NY-Boston Time Variability | −1/+5 | −.5 /x | −.3/+7 | −0/+ unknown | −1/+2 | na | −.2/+.5 |
| NY-Boston Door To Door Price | 284 | 525 | 227 | ??? | 111 | na | 283 |
| Land Use | can't expand | minimal | intense | intense | minimal | minimal | minimal |
| Environmental Impact | high | low | medium | low | medium | low | low |
| Investment Required | $10 B+ per airport | none | $10 B+ per line | $20 B+ per line | $11 B+ per city | $150 M+ per city | $122 M+ per city |
| Time To Initial Benefit | 10+ yrs | now | 10+ yrs | 10+ yrs | 15+ yrs | 5 yrs | 5 yrs |

Advantage: Fly-by-Wire Flight Control System

The Vy 400 fly-by-wire control system has the following features:

1. Dual channel, N-modular redundant.

2. Advanced avionics and autopilot.

3. Envelope protection.

4. Mission protection, including advanced geofencing, which avoids intentional (i.e. occupant-initiated) crashes.

Advantage: Reliability

The Vy 400 is reliable, using a single Pratt & Whitney Canada (P&WC) PTEA-67F engine, one of the most reliable engines ever built, and vastly simplified systems (e.g. no control cables, hydraulics, or fuel lines).

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1:
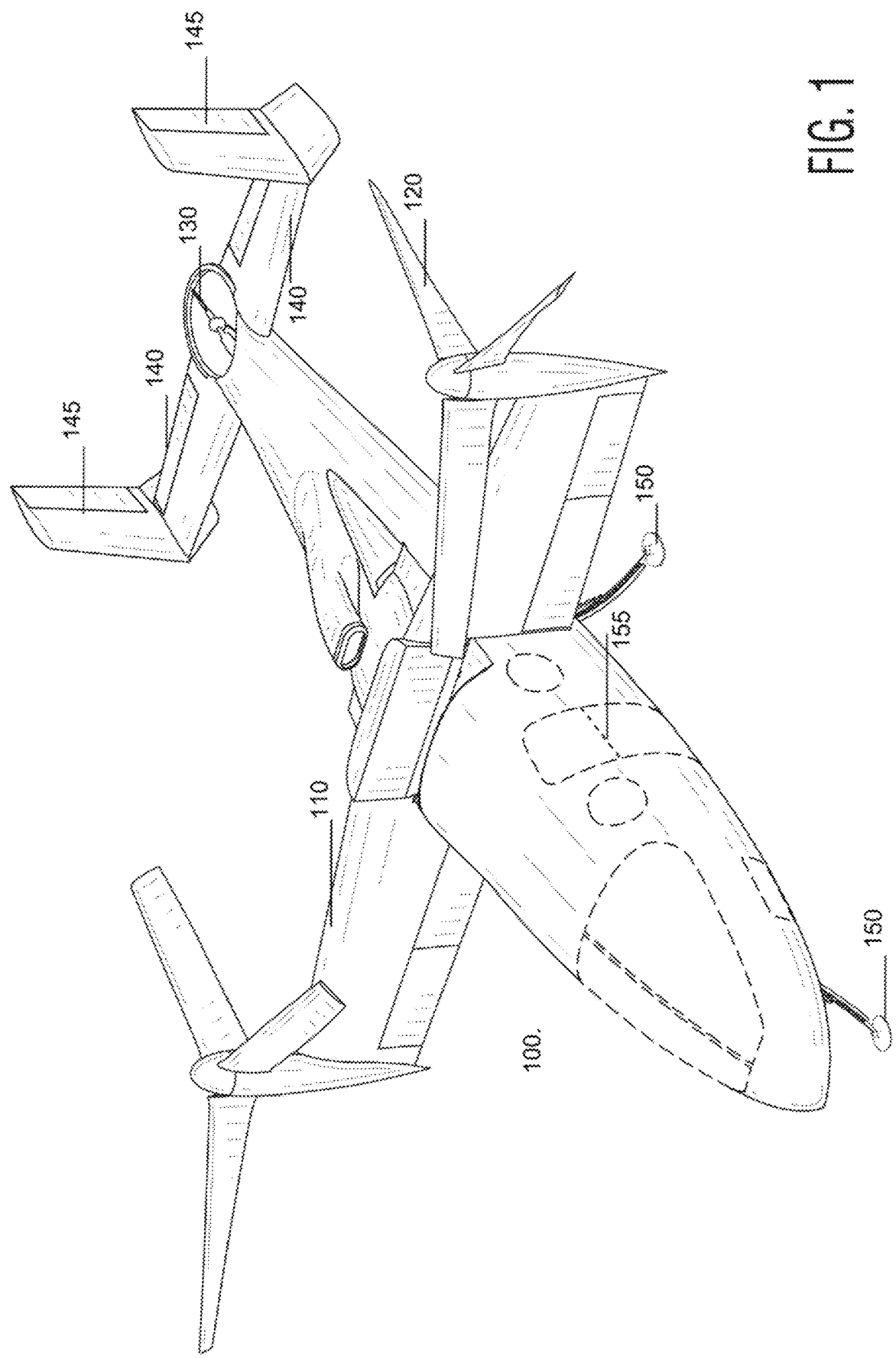
FIG. 1 shows the aircraft in helicopter mode, gear down, left front top perspective.
Figure 2:
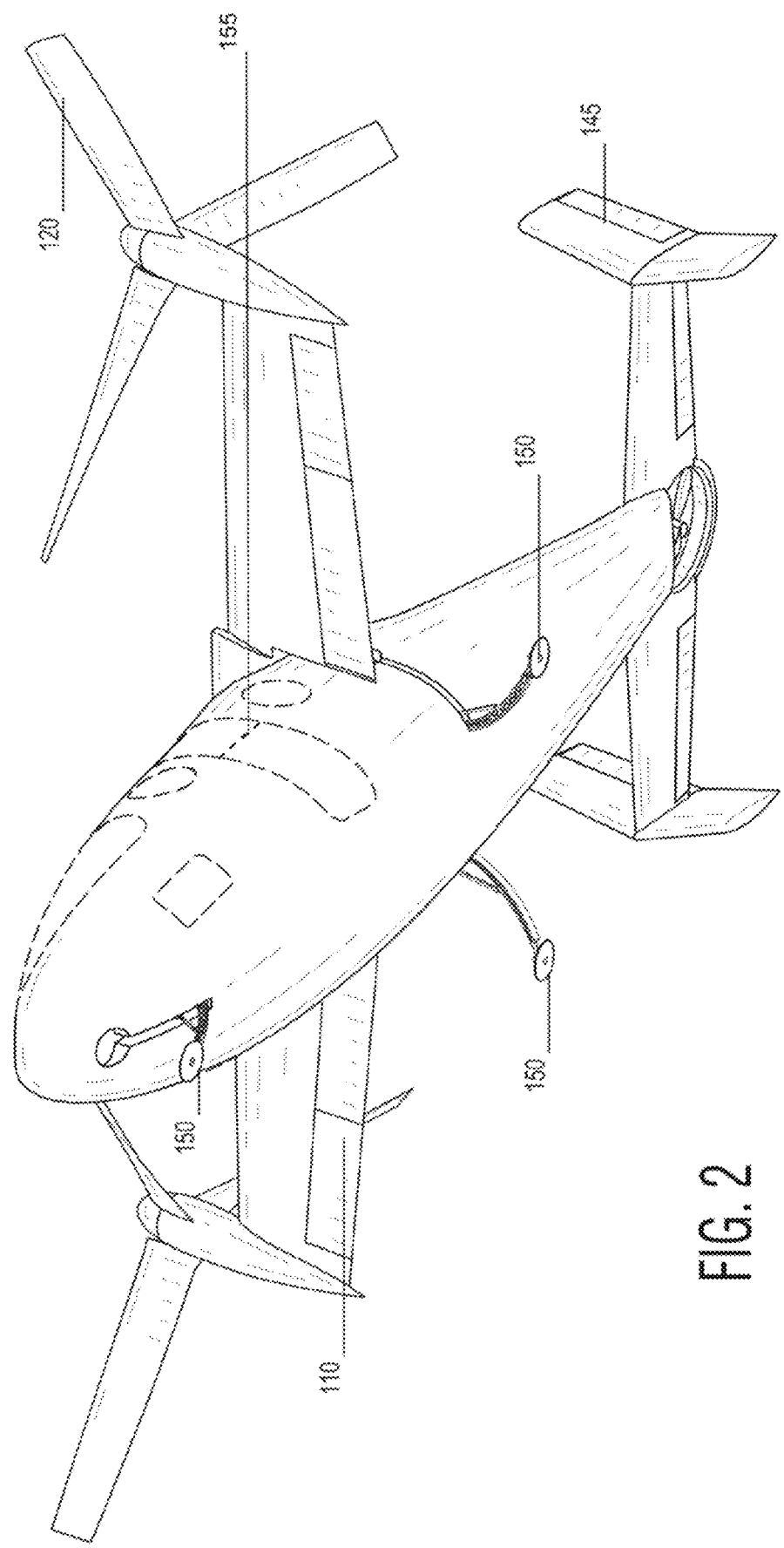
FIG. 2 shows the aircraft in helicopter mode, gear down, left front bottom perspective.
Figure 3:
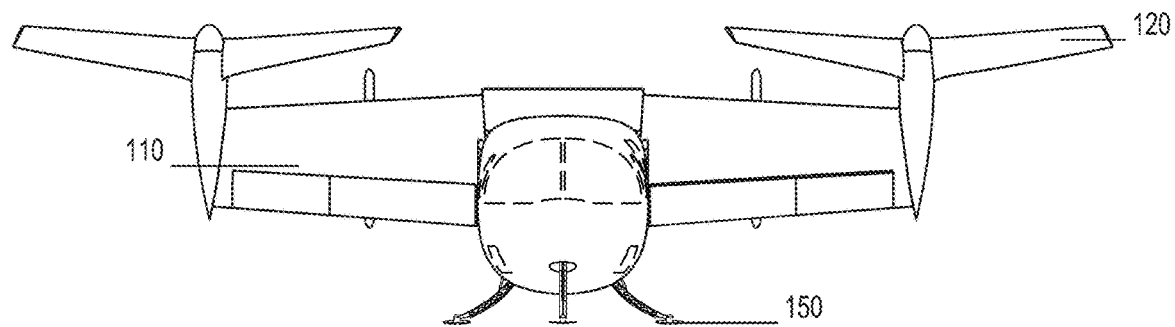
FIG. 3 shows the aircraft in helicopter mode, gear down, front (nose of aircraft).
Figure 4:
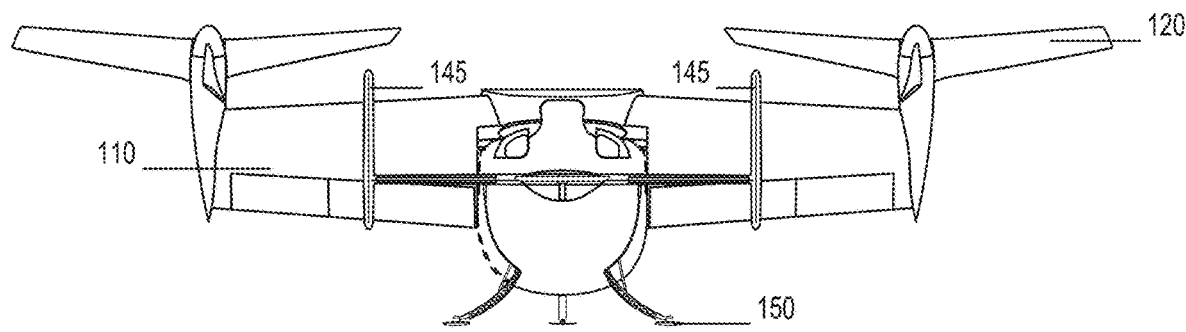
FIG. 4 shows the aircraft in helicopter mode, gear down, back (tail).
Figure 5:
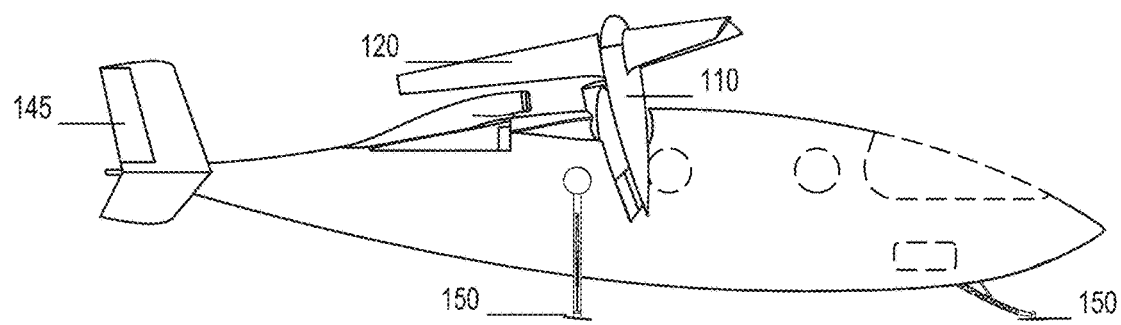
FIG. 5 shows the aircraft in helicopter mode, gear down, right.
Figure 6:
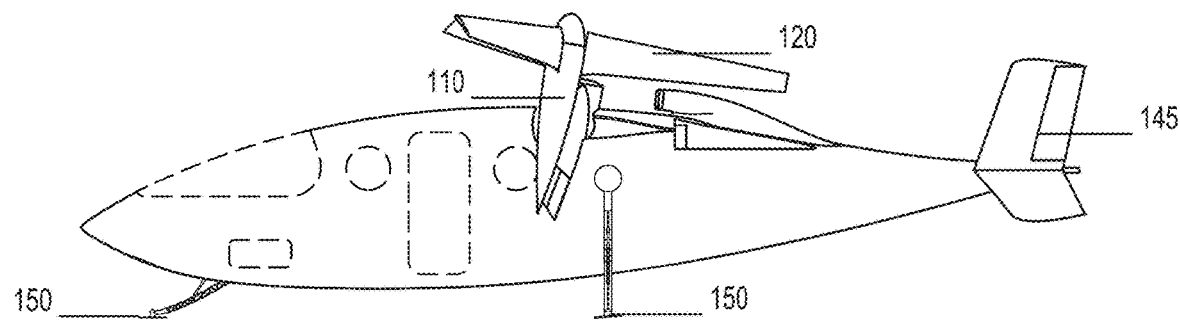
FIG. 6 shows the aircraft in helicopter mode, gear down, left (door side).
Figure 7:
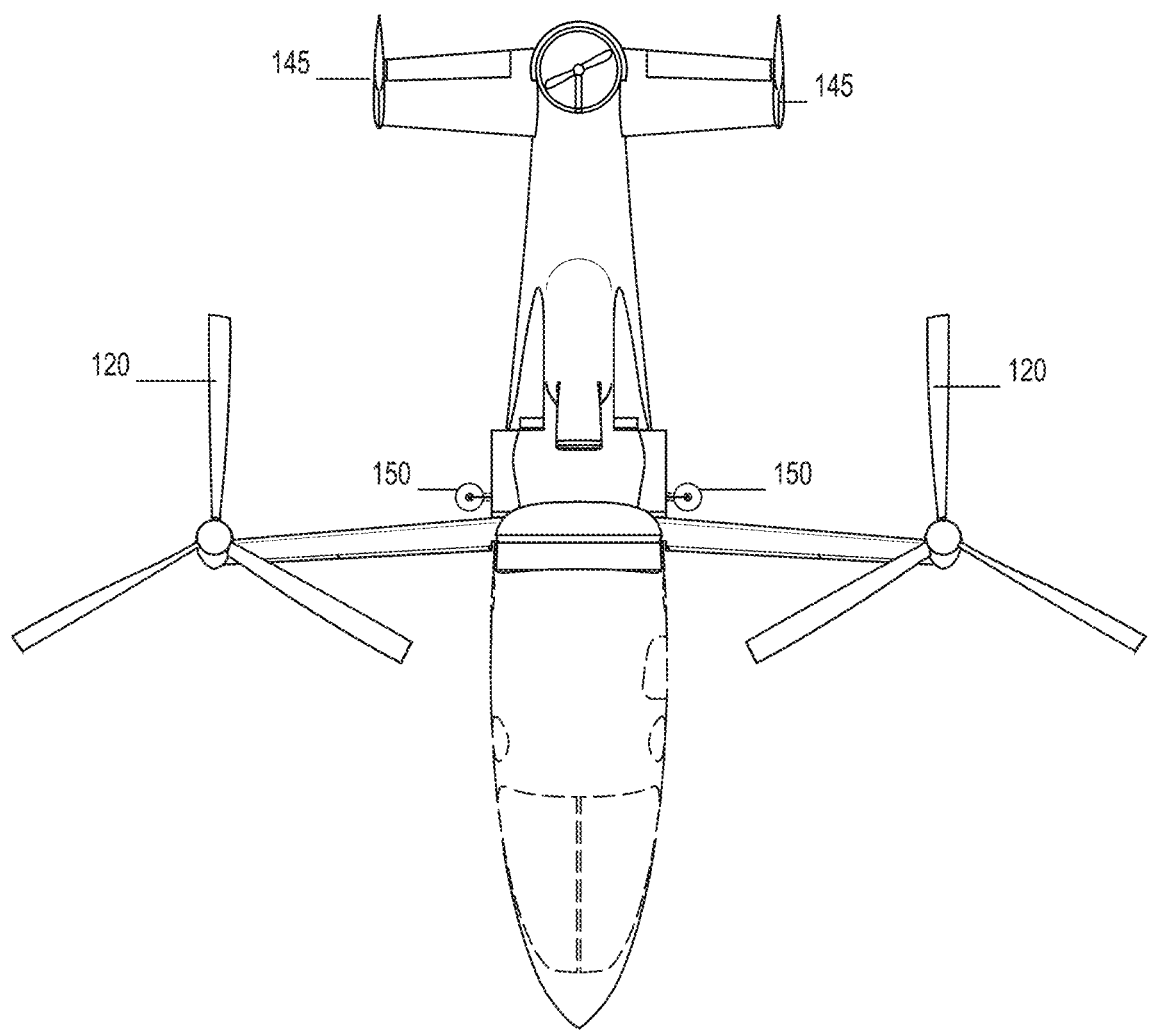
FIG. 7 shows the aircraft in helicopter mode, gear down, top.
Figure 8:
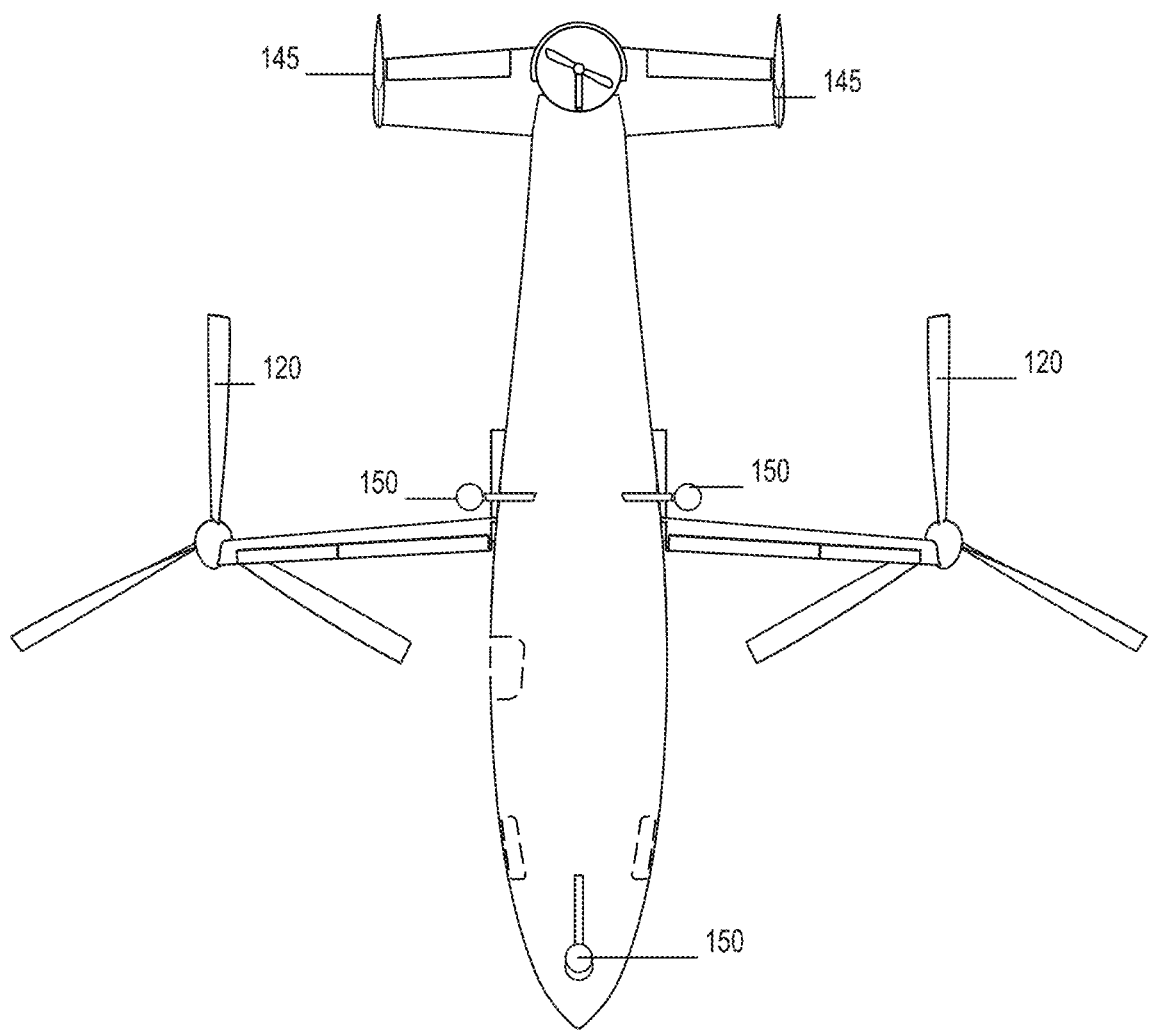
FIG. 8 shows the aircraft in helicopter mode, gear down, bottom.
Figure 9:
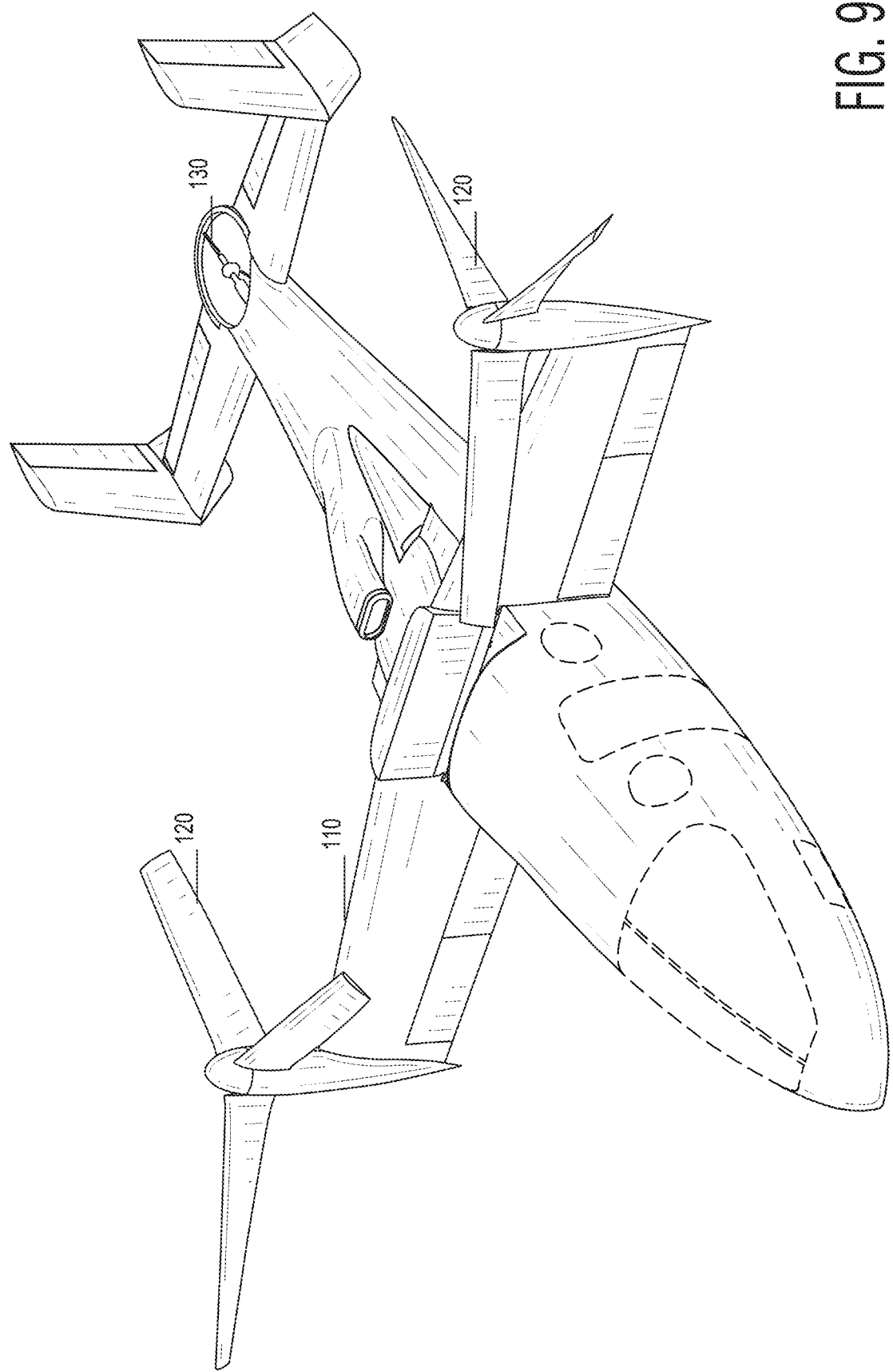
FIG. 9 shows the aircraft in helicopter mode, gear up, left front top perspective.
Figure 10:
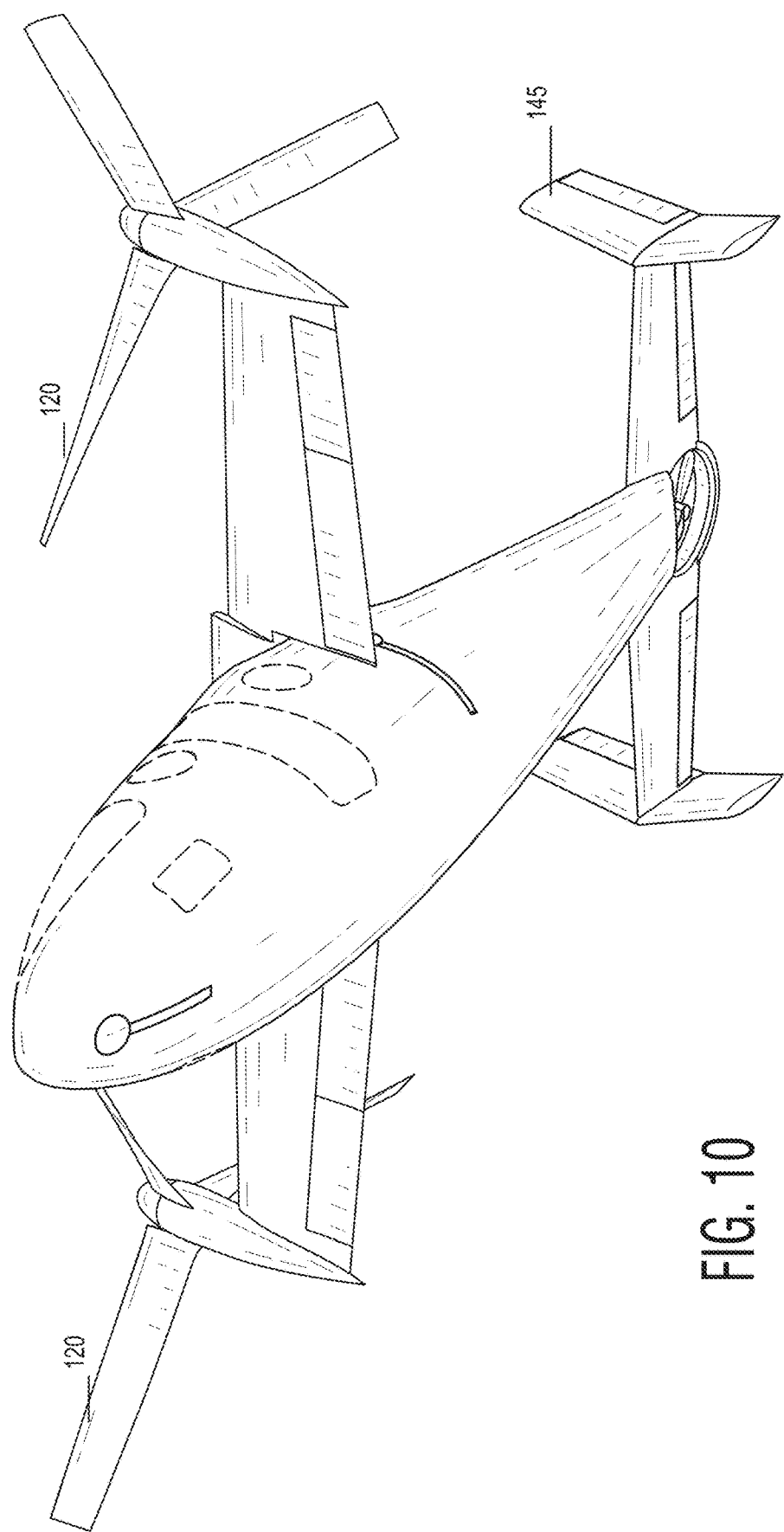
FIG. 10 shows the aircraft in helicopter mode, gear up, left front bottom perspective.
Figure 11:
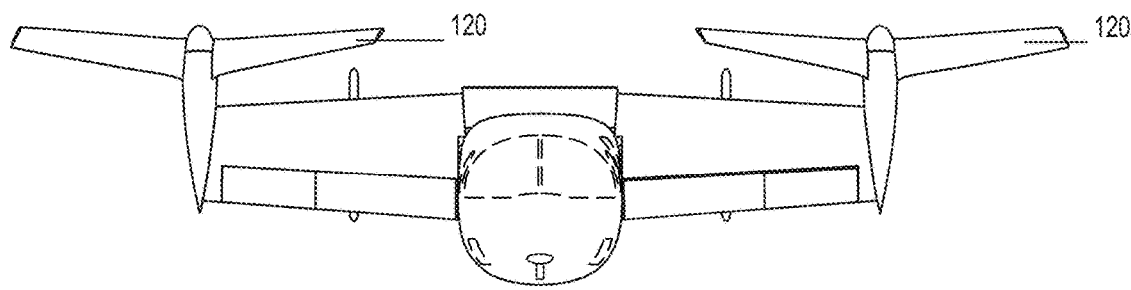
FIG. 11 shows the aircraft in helicopter mode, gear up, front (nose of aircraft).
Figure 12:
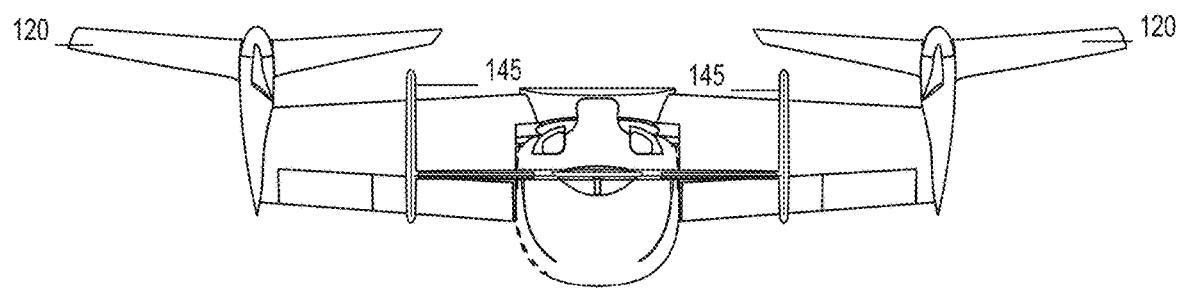
FIG. 12 shows the aircraft in helicopter mode, gear up, back (tail).
Figure 13:
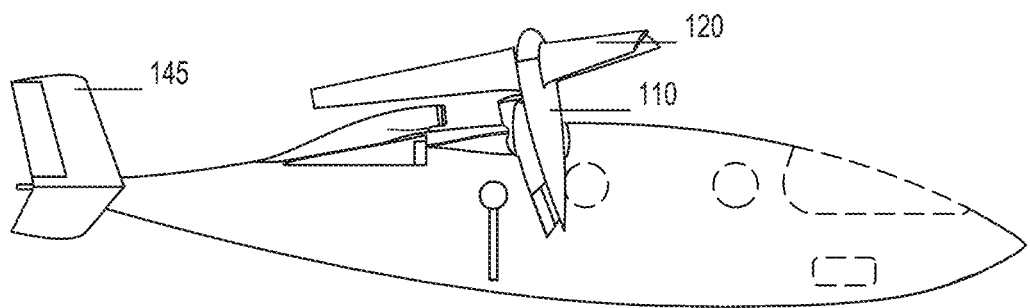
FIG. 13 shows the aircraft in helicopter mode, gear up, right.
Figure 14:
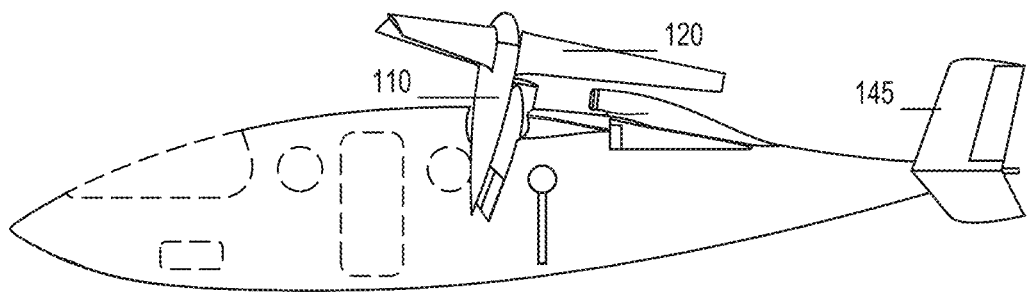
FIG. 14 shows the aircraft in helicopter mode, gear up, left (door side).
Figure 15:
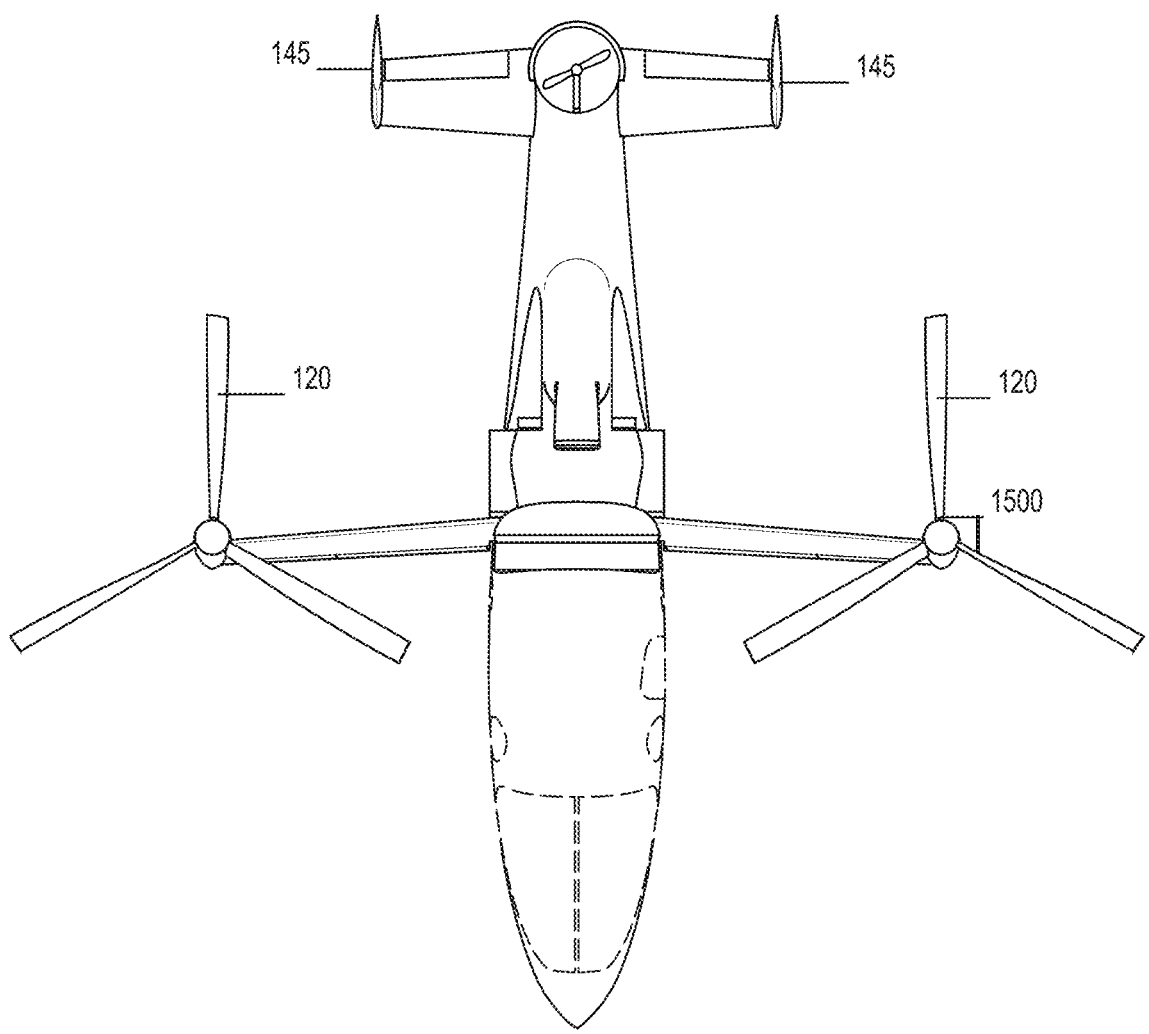
FIG. 15 shows the aircraft in helicopter mode, gear up, top.
Figure 16:
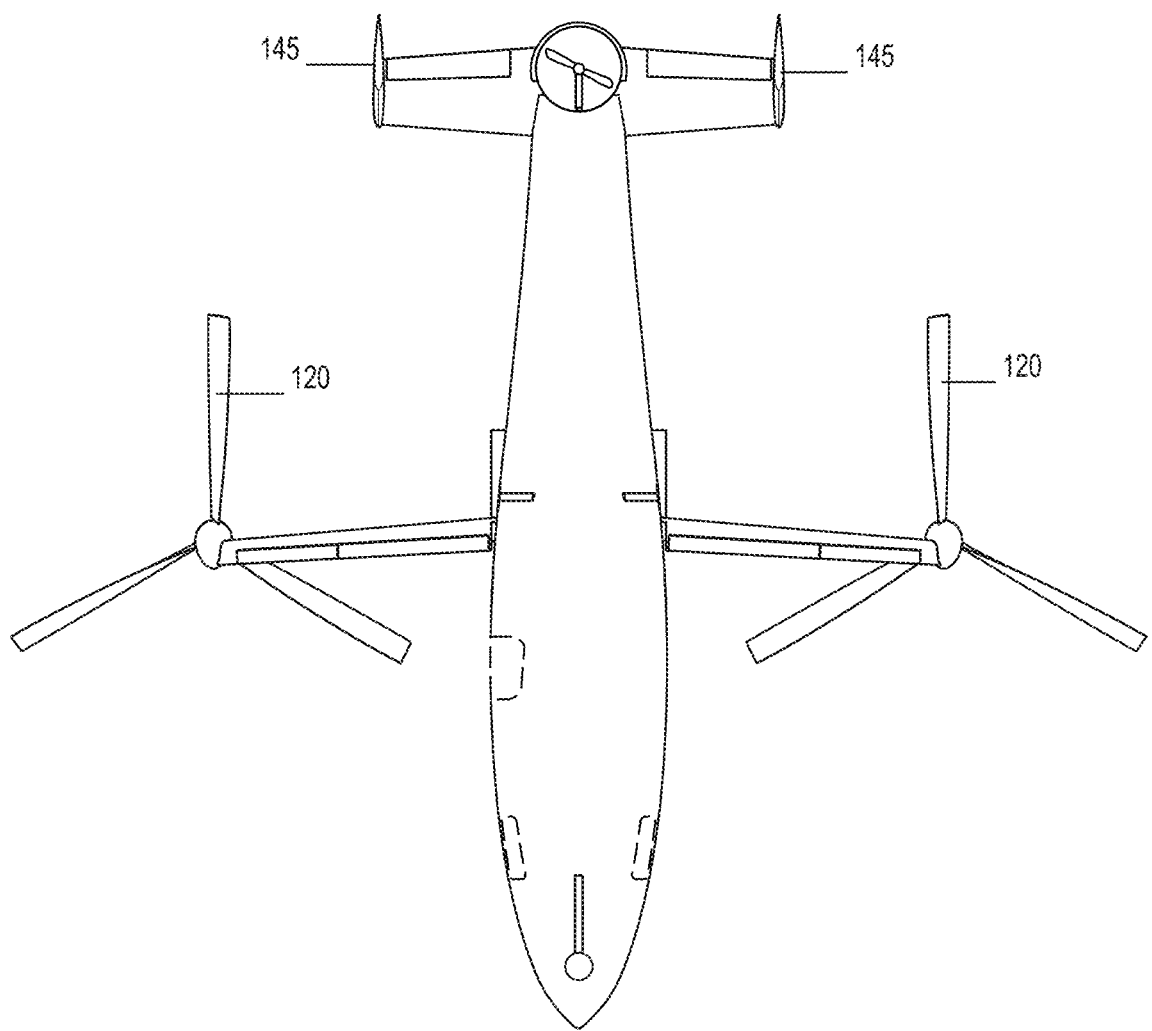
FIG. 16 shows the aircraft in helicopter mode, gear up, bottom.
Figure 17:
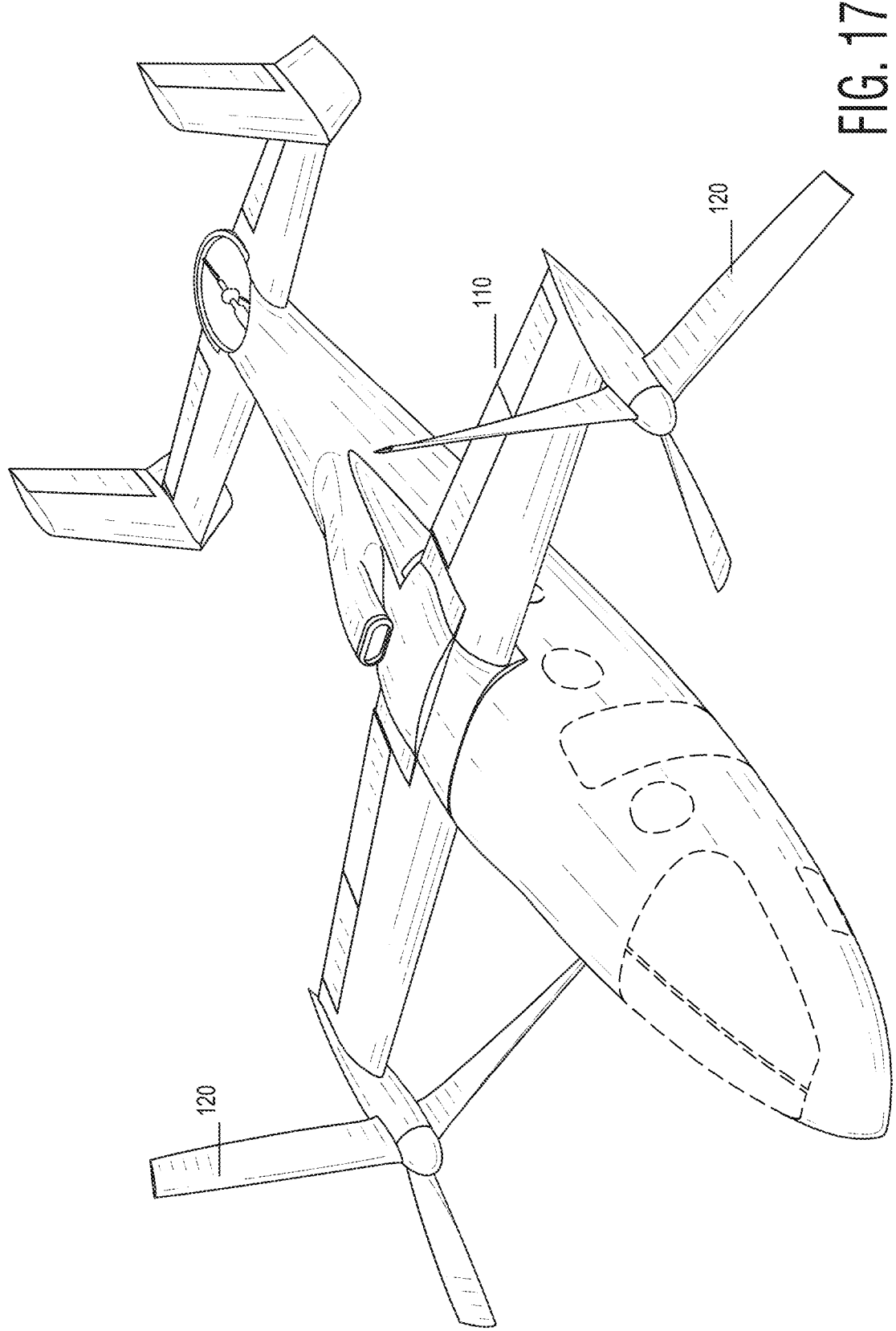
FIG. 17 shows the aircraft in airplane mode, gear up, left front top perspective.
Figure 18:
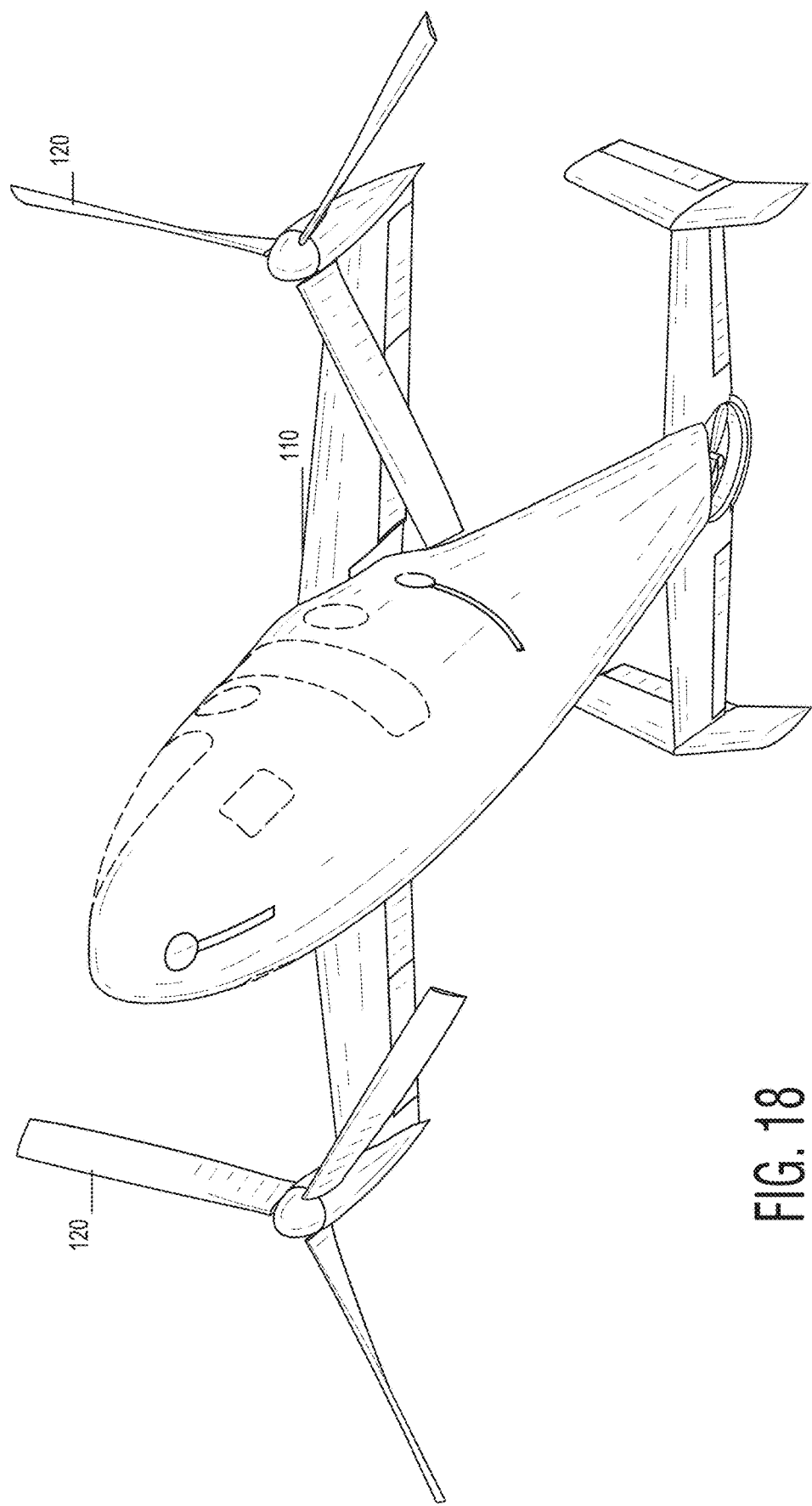
FIG. 18 shows the aircraft in airplane mode, gear up, left front bottom perspective.
Figure 19:
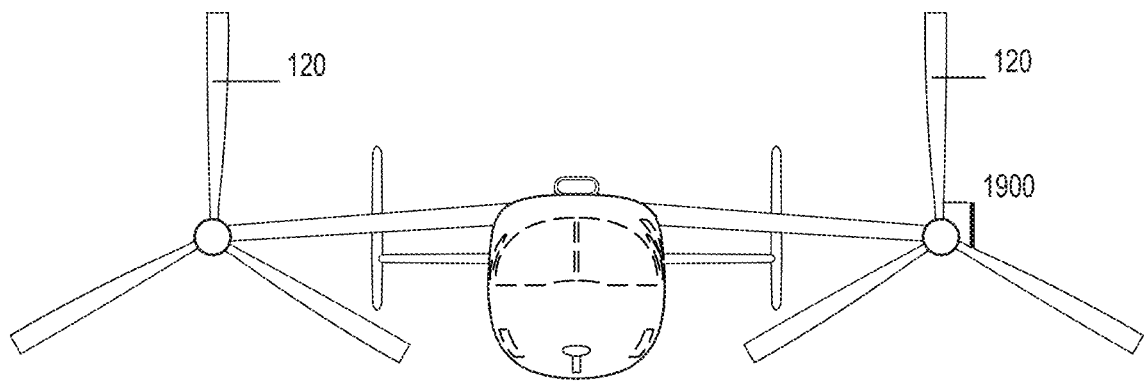
FIG. 19 shows the aircraft in airplane mode, gear up, front (nose of aircraft).
Figure 20:
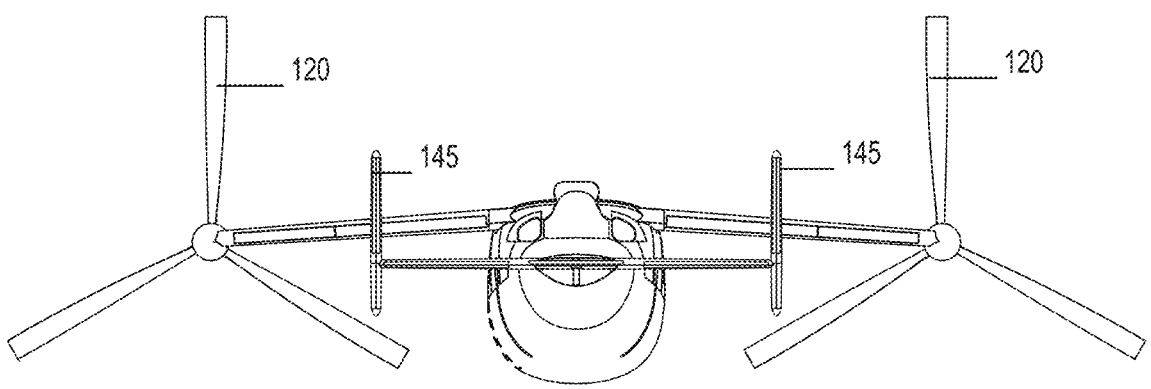
FIG. 20 shows the aircraft in airplane mode, gear up, back (tail).
Figure 21:
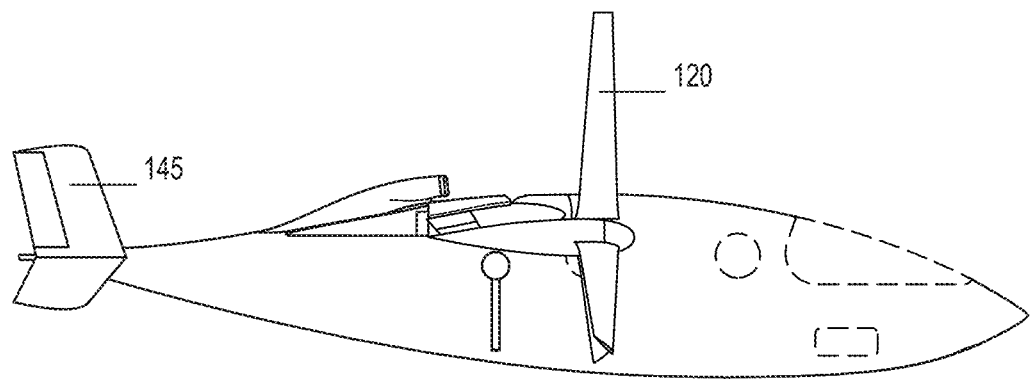
FIG. 21 shows the aircraft in airplane mode, gear up, right.
Figure 22:
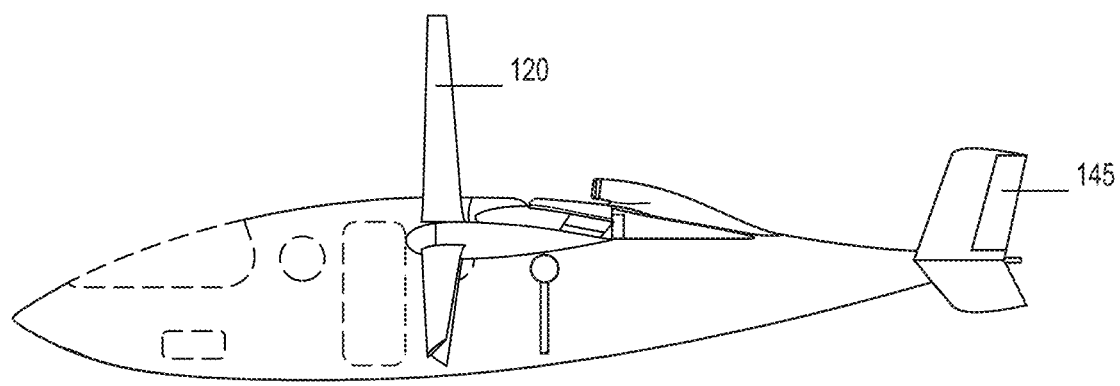
FIG. 22 shows the aircraft in airplane mode, gear up, left (door side).
Figure 23:
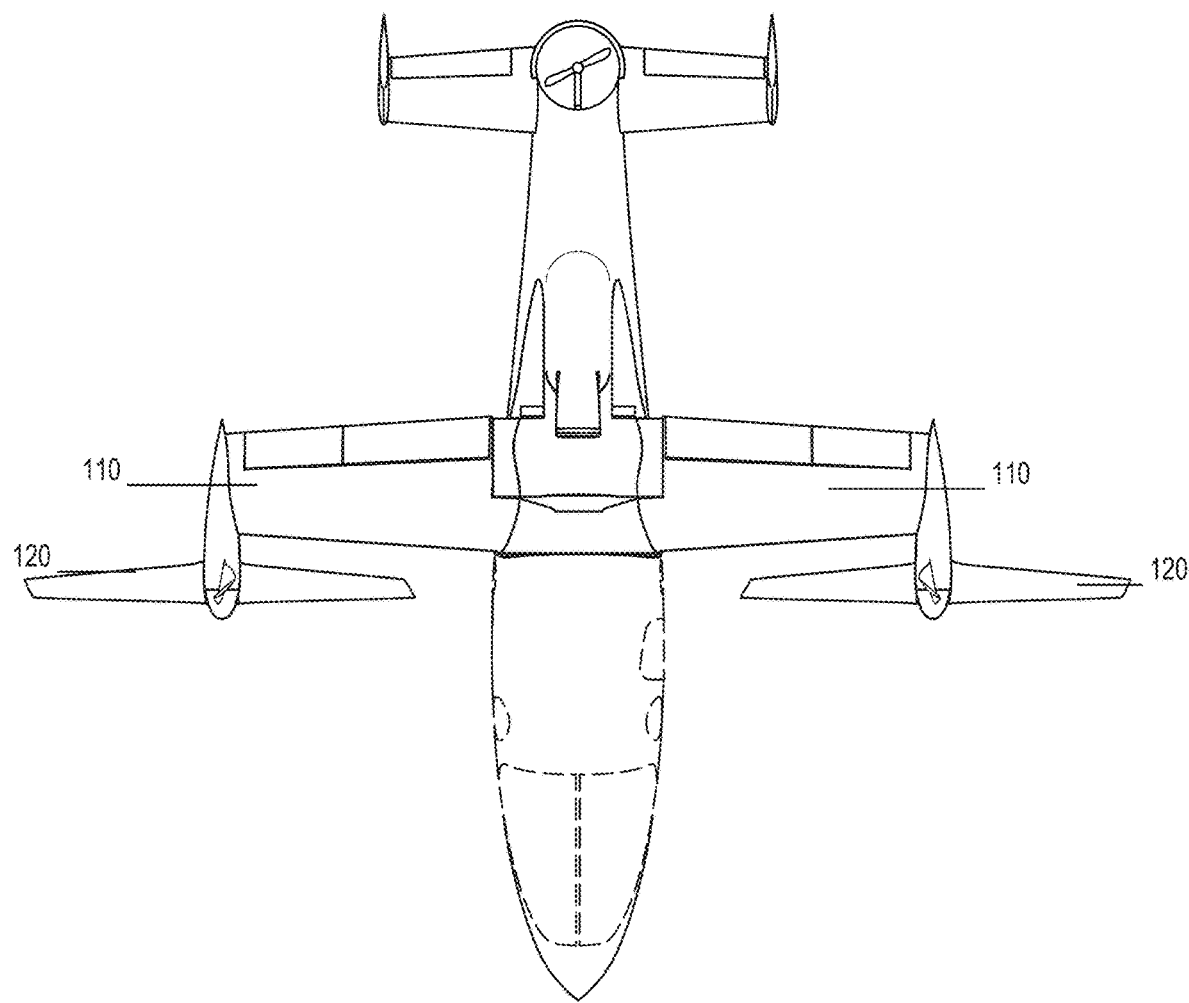
FIG. 23 shows the aircraft in airplane mode, gear up, top.
Figure 24:
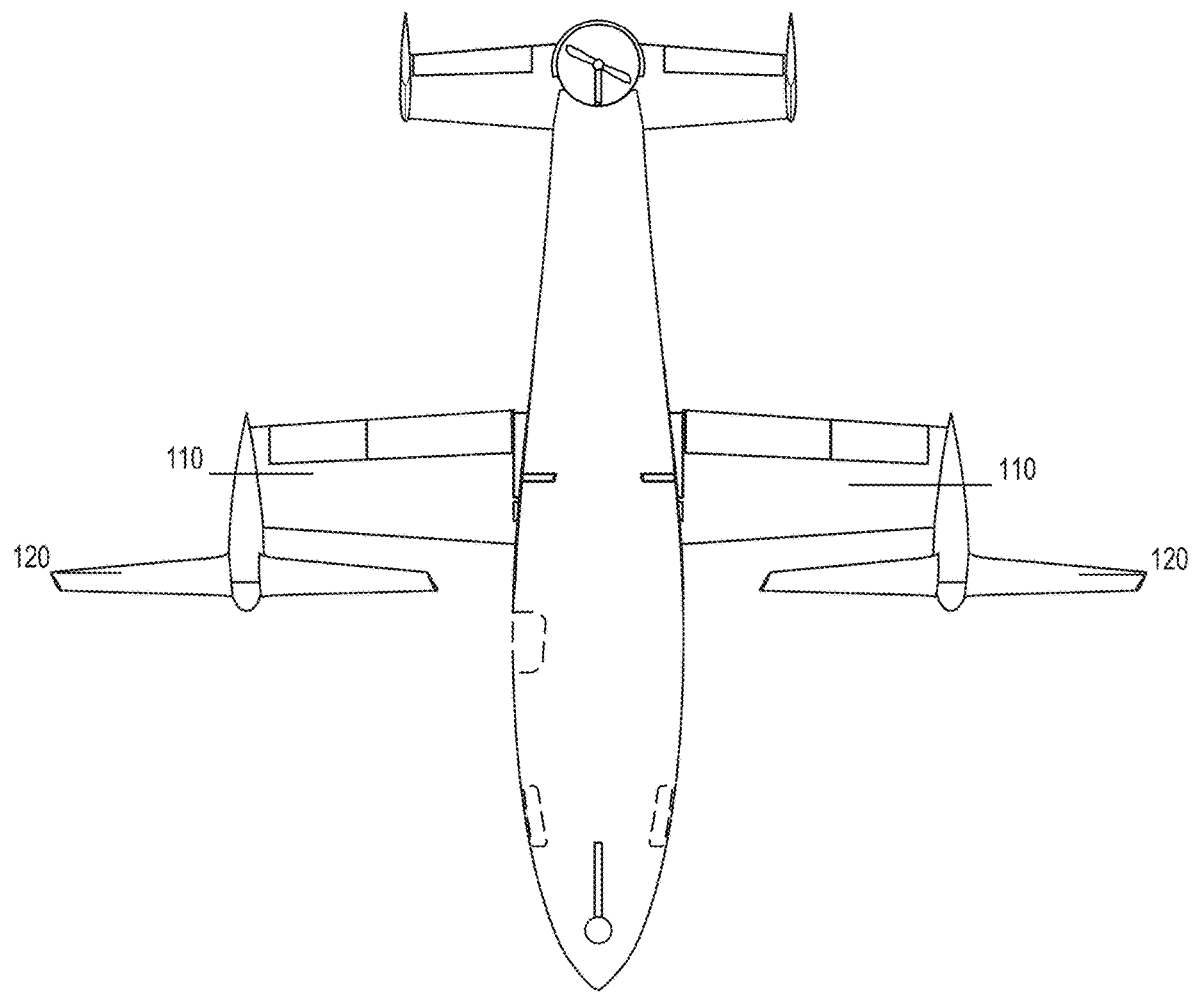
FIG. 24 shows the aircraft in airplane mode, gear up, bottom.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

CTOL aircraft—Conventional take-off and landing aircraft (www.wikipedia.org/wiki/CTOL).

eVTOL aircraft—Electric VTOL aircraft.

FIKI—Flight into known icing.

Inside-the-city—SEE within-city.

IoT—Internet of Things (www.wikipedia.org/wiki/Internet_of_things).

PAC—Personal aircraft, a single-person aircraft.

PAV—Personal air vehicle (www.wikipedia.org/wiki/Personal_air_vehicle).

Proprotor (AKA "prop-roter")—A spinning airfoil that is used as both an airplane-style propeller and a helicopter-style rotor (www.wikipedia.org/wiki/Proprotor).

QTR aircraft—Quad tiltrotor aircraft, i.e. an aircraft using four tiltrotors.

Tiltrotor aircraft (AKA "tilt-rotor aircraft")—A tiltrotor aircraft generates lift and propulsion by way of one or more powered rotors mounted on rotating engine pods or nacelles usually at the ends of a fixed wing or an engine mounted in the fuselage with drive shafts transferring power to rotor assemblies mounted on the wingtips. It combines the vertical lift capability of a helicopter with the speed and range of a conventional fixed-wing aircraft. For vertical flight, the rotors are angled so the plane of rotation is horizontal, lifting the way a helicopter rotor does. As the aircraft gains speed, the rotors are progressively tilted forward, with the plane of rotation eventually becoming vertical. In this mode the wing provides the lift, and the rotor provides thrust as a propeller. Since the rotors can be configured to be more efficient for propulsion and it avoids a helicopter's issues of retreating blade stall, the tiltrotor can achieve higher speeds than helicopters (www.wikipedia.org/wiki/Tiltrotor).

Tiltwing aircraft (AKA "tilt-wing aircraft")—A tiltwing aircraft features a wing that is horizontal for conventional forward flight and rotates up for vertical takeoff and landing. It is similar to the tiltrotor design where only the propeller and engine rotate (www.wikipedia.org/wiki/Tiltwing).

Transcend Vy 400—The VTOL disclosed in this patent document.

TRL—Technology readiness level (www.wikipedia.org/wiki/Technology_readiness_level).

TVF—Transformative Vertical Flight. Since 2014, AHS International has been leading a series of workshops with NASA, AIAA, and SAE on Transformative Vertical Flight (TVF), and built a community of aerospace professionals that includes technical, regulatory, and business elements, and exploring the potential for new forms of air transportation systems with innovative propulsion systems. The focus has been on systems that embody combinations of on-demand, electric and hybrid-electric propulsion, and vertiport-capable configurations and designs (www.vtol.org/what-we-do/transformative-vtol-initiative).

V/STOL—A vertical and/or short take-off and landing (V/STOL) aircraft. VTOL aircraft are a subset of V/STOL aircraft that do not require a runway (www.wikipedia.org/wiki/V/STOL).

VTOL aircraft—Vertical take-off and landing (VTOL) aircraft (www.wikipedia.org/wikiNTOL).

Within-city—Intra-city, as opposed to inter-city or city-to-city.

Operation

Referring to FIGS. 1-25, the Vy 400 is a single hull VTOL tilt-wing passenger aircraft 100 having a maximum takeoff weight of 6990 pounds, cruise speed of 350 knots, and a maximum range of 500 miles. The Vy 400 VTOL tilt-wing aircraft has a fuselage 2500, the fuselage having a front section 2510 with a cockpit for an optional pilot occupant, a middle section 2520 having a cabin for multiple passenger occupants, and a rear section 2530 for the engine and fuel tank. A single wing member 110 is rotatably coupled to the fuselage, each end of the wing having a propeller 120 disposed at a fixed position on the outer edge of the wing, each propeller mechanically coupled along a drive path to the single engine, which is deposed on the rear section of the fuselage. The rear (or tail) section of the fuselage includes a horizontally-mounted stabilizing propeller 130 at the center of the tail section, two horizontal stabilizers 140 connected to the tail section, connected to two vertical stabilizers 145. Helicopter-style skids or footpads 150 extend from the hull for takeoff and landing and retract flush with the hull during flight.

Like all VTOL aircraft, the Vy 400 flies like a helicopter (helicopter mode) when the wings are rotatably angled so that the plane of rotation is approximately horizontal 1500, the precise angle selected dynamically to achieve desired flight behavior with regard to flight path angle, rate of climb, station keeping et al., and the Vy 400 flies like a jet (airplane mode) when the wings are rotatably angled so that the plane of rotation is approximately vertical 1900, the precise angle selected dynamically to achieve desired flight behavior with regard to flight deck angle, rate of climb, true air speed, et al.

This Vy 400 has been designed with a single market as its only application, namely a 6-seat thin haul commuter airline. This has resulted in many design tradeoffs: range has been traded for speed, accommodations have been traded off for inexpensive operation, and the aircraft is designed with the goal of a low unit cost. With a price of $3.5 million, the Vy 400 costs significantly less than the projected $25 million price for the AgustaWestland AW609 (AKA Leonardo 609), the closest comparable aircraft. The price per seat is $583,333 for the Vy 400, $2.8 million for the Leonardo 609, and $400,000-$840,000 for a typical commercial airliner. A price-optimized autonomous Vy 400 delivers a price per seat of only $400,000.

The major components of the aircraft, arranged approximately by decreasing cost, are as follows:

Powerplant.

The Vy 400 is powered by a single Pratt & Whitney Canada PT6 (P&WC) PTEA engine, one of the most reliable engines ever built. The engine is connected via a drivetrain to two propellers, one on each wing, and the horizontally-mounted tail propeller.

Fly-by-Wire and Flight Control.

The first fly-by-wire commercial aircraft was the Airbus A320 in 1988 with a unit cost of $99 million. Since then the price and time between major development milestones have fallen exponentially so that the latest fly-by-wire aircraft, the 2014 Embraer Legacy 450, has a unit cost of $17 million. The complexity of general aviation fly-by-wire systems has also decreased since the first systems in the Dassault Falcon in 2007 and the Gulfstream 650 in 2008.

Figure 32:
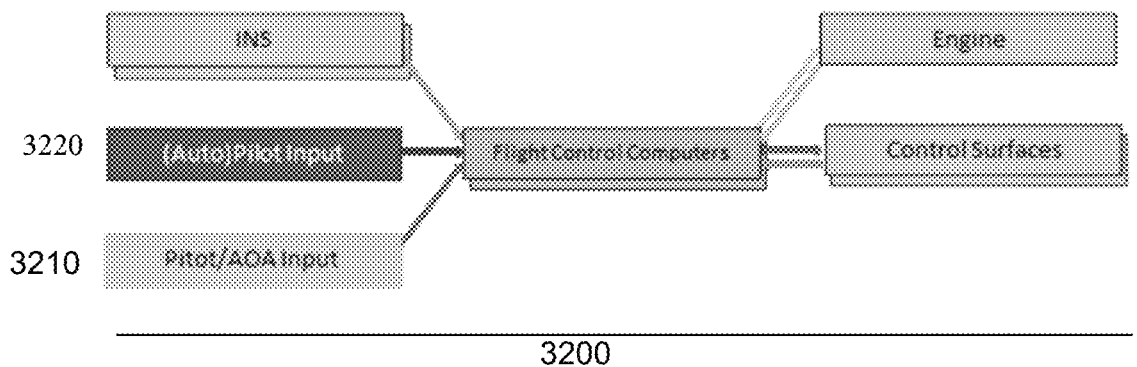
FIG. 32 is a diagram of the fly-by-wire system components.

Referring now to FIG. 32, fly-by-wire system components. Primarily, the Vy 400 fly-by-wire system 3200 performs the following essential functions typical of a fly-by-wire flight control system:

1. Converts pilot 3210 or autopilot 3220 input into movements of the control surfaces, engine power, and parachute.
2. Ensures the aircraft is stable in all flight regimes.
3. Enforces control laws that ensure that the aircraft flies within architectural limits.

Secondarily, the fly-by-wire system automates the transition process from vertical (helicopter mode) to horizontal (airplane mode) flight and back. Any additional flight automation (including, but not limited to, automating takeoff and landing, station holding, and waypoint tracking) is performed by an autopilot system.

Figure 33:
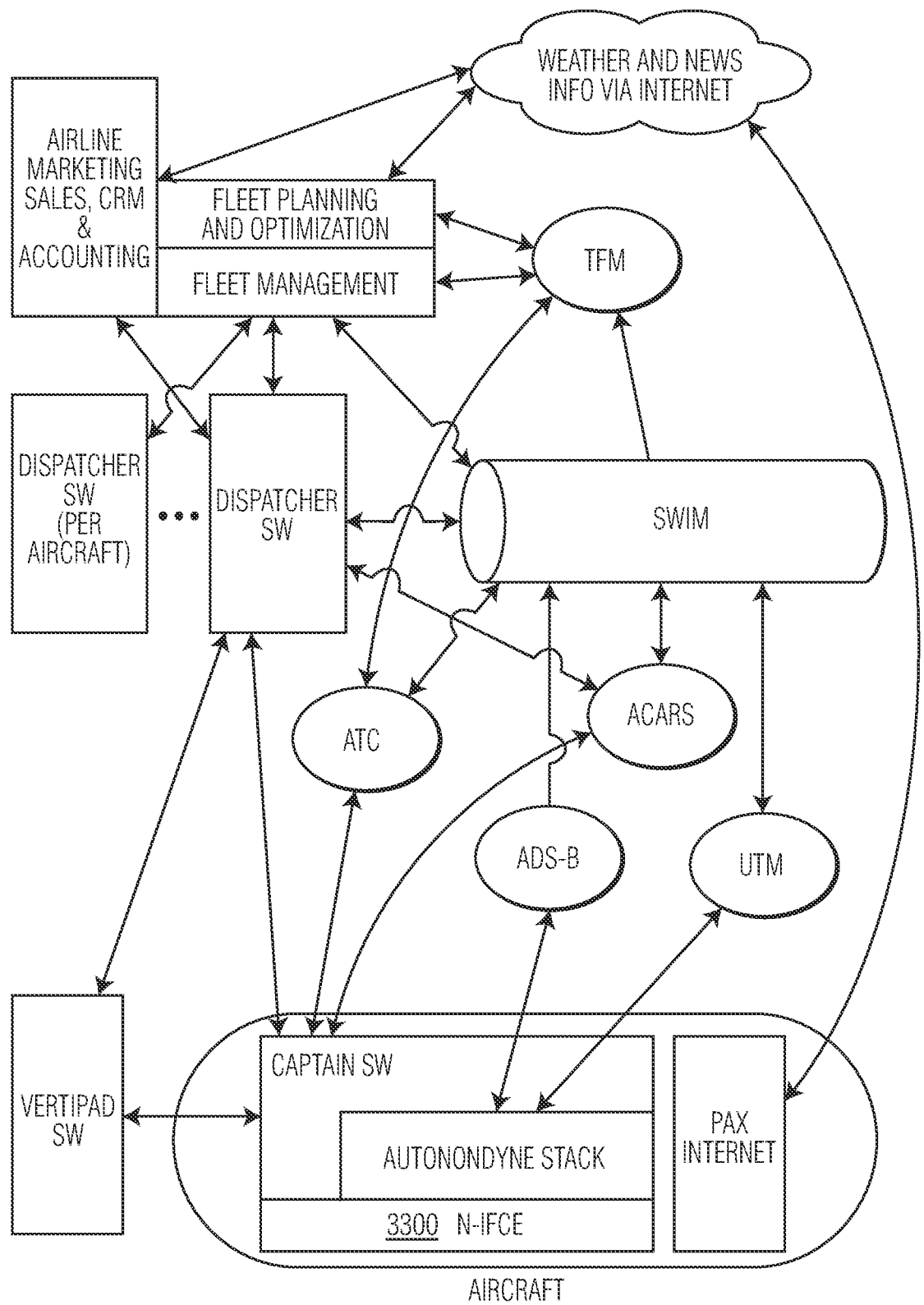
FIG. 33 is a diagram of the software architecture design.

Referring now to FIG. 33, software architecture design. Regarding flight control generally, a deterministic network 3300 of Distributed Flight and Actuator Controllers (DFACs) implements Integrated Flight Control Electronics (IFCE) functionality.

Figure 34:
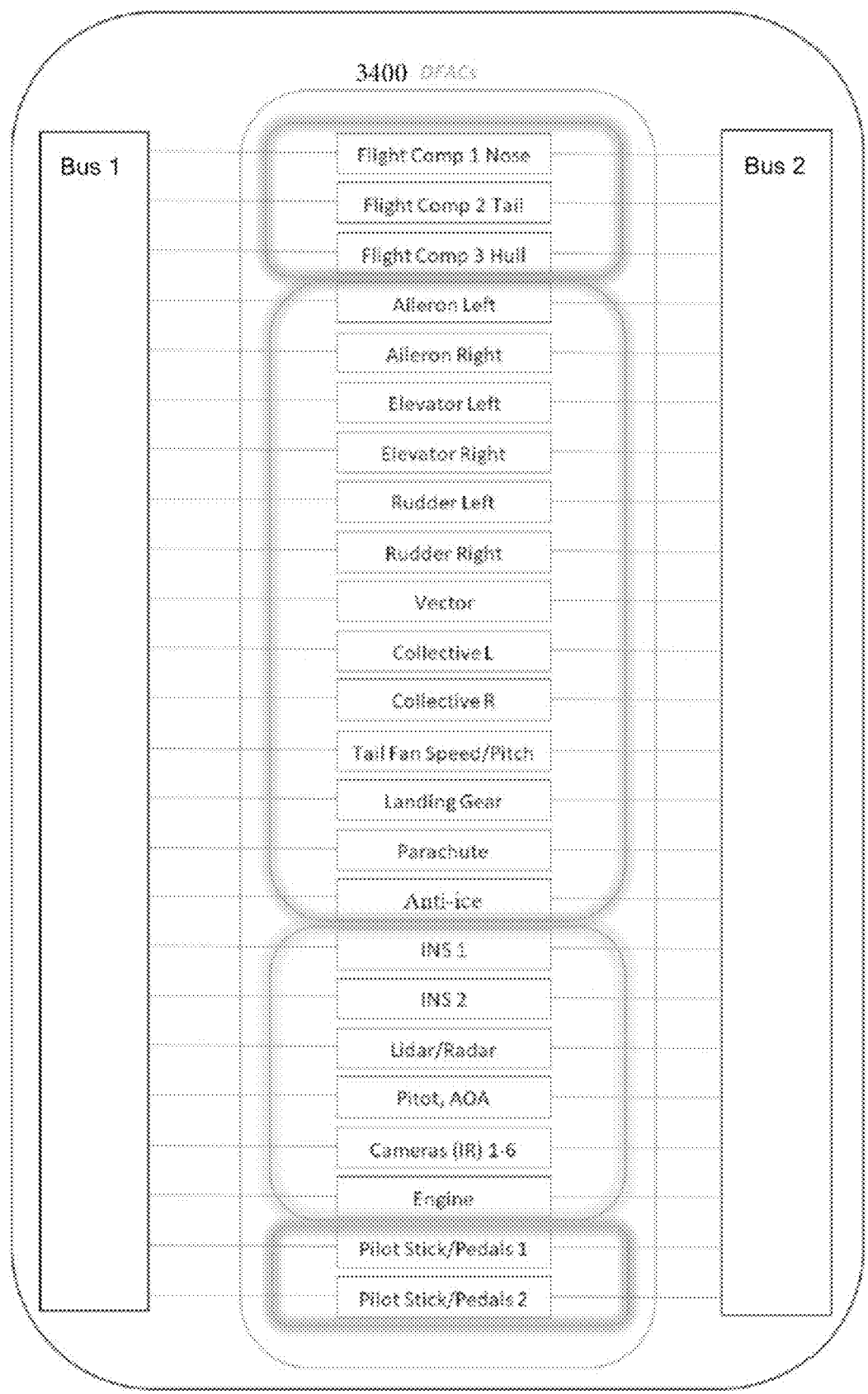
FIG. 34 is a diagram of the networked integrated flight control electronics (N-IFCE) components.

Referring now to FIG. 34, N-IFCE, in some embodiments, DFACs 3400 combine Flight Control System (FCS) and Remote Electronics Unit (REU) capabilities, while in other embodiments, FCS and REU functions are implemented by separate units. All units are interconnected via a dual-redundant bus architecture, and the resulting Networked IFCE (N-IFCE) 3300 is less expensive, higher performance, and more flexible, while achieving critical systems engineering safety guarantees.

More specifically, the FCS software includes a system of software modules devised so that certain modules implement "lower-level" or "lower-layer" functionality and certain other modules implement "higher-level" or "higher-layer" functionality, along with certain relationships implemented in a control and communications scheme among the modules.

It is typically the case that lower-level modules perform less complex computations under stricter time and reliability constraints, while higher level modules may perform more complex computations with looser time and reliability constraints. It is a key attribute of the FCS that necessary safety and performance guarantees are always met, while still enabling higher-level computations to be completed on a best-effort basis.

The FCS system may be implemented on one or more physical computing devices. The software code loaded onto each computing device is capable of performing all of the same functions as the code loaded onto any computing device, though the code may differ necessarily to accommodate different compute device attributes (e.g. hardware architecture) or because it was derived from differing source code in order to avoid "common-mode failures." The code on each device is self-configuring, adapting itself to its specific role based on the overall architecture of the aircraft and the functionality required by the particular computing device it is loaded onto.

The code running on all of the computing devices shares information as required to compute the desired behavior of the aircraft, using one or more proven deterministic control system techniques. Generally, a decisioning scheme compares the computations and decides what actions to take. Computations that fall outside an expected normal variability range cause the software that performed it to be excluded from further participation in the control system, and a warning is logged within the FCS.

Beyond a pre-defined trigger point that may or may not differ by warning type, the FCS signals a caution or warning to the aircraft's pilot, or activates the aircraft parachute, or both.

The lowest level FCS code may be implemented as "firmware" in a field-programmable gate array (FPGA) or other special-purpose memory device, or in any other way that enables the required timing and safety requirements to be met. Higher-level code is implemented as one or more computing processes on a single, or group of cooperating computing devices, any of which may be physically co-located on a single computer board, or distributed throughout the aircraft and connected via a bus or network with appropriate characteristics.

The FCS software interfaces with software running on third-party systems and equipment, including but not limited to sensors, autopilots, radios, actuators, motor control modules, cameras, batteries, and displays.

The highest level FCS software implements the role of captain of the aircraft during unpiloted operation. The captain software validates and accepts missions; monitors aircraft systems; directs lower-level FCS software via simulated control inputs for power, propeller blade pitch, wing angle, rudder motion, elevator motion, flaperon motion, gear position, pressurization, cabin temperature, and parachute deployment; communicates with air traffic control (ATC); computes deviations from flight plans and implements them; acts on conflict resolution advisories from other aircraft systems; and performs other tasks required for the safe and efficient piloting of the aircraft.

A particularly valuable feature of the FCS is its capability to perform a fully automated preflight check of all aircraft systems. The nominal values derived during certification, as embodied in the Vy 400's Pilot Operating Handbook and applicable maintenance manuals, are programmed into routines in the FCS that make use of the various sensors and other feedback mechanisms available to the FCS to ascertain that all values are within nominal ranges prior to accepting takeoff command inputs from the pilot. This enhances operating safety while at the same time reduces the time required for preflight checks, which increases the operating efficiency of the Vy 400 in airline use.

The programming of the FCS with regard to the handling of fault conditions makes use of techniques proven by NASA for the Space Shuttle and other spacecraft, as well as by state of the art implementations on other fly-by-wire jet aircraft, such as the Embraer Legacy 450 and the Gulfstream G650. Such techniques generally involve, but are not limited to, the use of predetermined fault-trees, which are logical structures that direct and constrain actions in accord with detected fault conditions, current aircraft flight parameters, and other system inputs. Unlike the example aircraft above, an advantage of the Vy 400 design is that the FCS is not programmed in highly complex ways to make use of multiple redundant systems in order to enable the aircraft to land while protecting the occupants. Instead, the Vy 400 makes use of its whole-airframe parachute to protect occupants, greatly simplifying the required fault-handling logic, and the programming, testing, certification, and maintenance of the same over time.

The FCS is also programmed to perform aircraft missions while protecting occupants from attempts to mis-fly the aircraft. The mission protection functionality makes use of commercially available terrain and obstacle databases such as those mandated by ICAO (www.skybrary.aero/index.php/Electronic_Terrain_and_Obstacle_Data_(eTOD)), and the ever more finely grained ones developed to facilitate drone-based services (www.airmap.com/platform/), along with fused real-time sensor data, to ensure that the aircraft cannot be flown into terrain or obstacles such as trees, buildings, boats, etc. In the most common case, attempts to mis-fly the aircraft are ignored when they do not accord with the pre-programmed flight plan. Should an aircraft occupant, including the pilot, manage in some way to induce a flight action that results in a projected impact, the aircraft maneuvers to avoid or minimize the impact energy, making use of the parachute and reorientation of the aircraft's attitude.

Propellers.

As VTOL aircraft gain speed and travel through the transition corridor (i.e. to/from vertical/horizontal flight), there are significant loading issues on both the propellers and gearbox. The Vy 400 uses propeller blades designed by FlexSys (www.flxsys.com/rotocraft). The FlexSys adaptive blades morph during operation, thereby reducing overall stress on the blades and gearbox (www-personal.umich.edu/-adriaens/Site/UM_CleanTech_files/Kota.pdf). With VTOL aircraft, there are design trade-offs between speed and hover efficiency of the propellers that are based on propeller disk size, chord, and twist. By employing blade-morphing technology, the Vy 400 changes the twist and the disk size, as required, during each rotation, without the complexity that is inhering in a helicopter hub.

In one embodiment, the main propellers have three blades, a disc diameter of fifteen feet, and a maximum tip speed of 855 feet per second (fps). In another embodiment, there are four blades with a maximum tip speed of 660 fps.

In one embodiment, the tailfan propeller has two blades, a disc diameter of three feet, a blade profile with no twist, and a tip speed of 855 feet per second (fps). In another embodiment, there are twelve blades with a maximum tip speed of 600 fps.

Avionics.

In addition to FCS avionics (discussed above), the Vy 400 includes industry-standard avionics systems including aircraft management, collision-avoidance, communications, flight recorders, monitoring, navigation, and weather.

The Vy can optionally be equipped with a standard AR (Augmented Reality) headset for each occupant, such as the Google Glass Enterprise Edition, and others in production and under development (www.aniwaa.com/best-of/vr-ar/best-augmented-reality-smartglasses/). These headsets receive data streamed from the avionics, including flight parameters such as speed, altitude and outside air temperature; journey information, such as moving map GPS displays of the aircraft's position and its ETA; video from external aircraft cameras; et al. Occupants may choose to view a 360° video feed synthesized from a minimum of four external consumer-grade cameras such as the GoPro Fusion (gopro.com/fusion) that have been arranged in such a way that the aircraft structure can be made to disappear from view, allowing the wearer to experience the flight as if they were in an invisible aircraft. This has practical use for the pilot, enabling significantly enhanced situational awareness, particularly during high workload, close quarters takeoff and landing maneuvers. It also has entertainment use for passengers, increasing the perceived value of their flight experience.

Fuel-System.

The Vy 400 has a single centralized primary fuel tank in the rear section of the fuselage, thereby reducing both complexity and cost. The primary fuel tank is crash resistant, and a secondary fuel tank gravity feeds to the engine.

Cabin.

Figure 26:
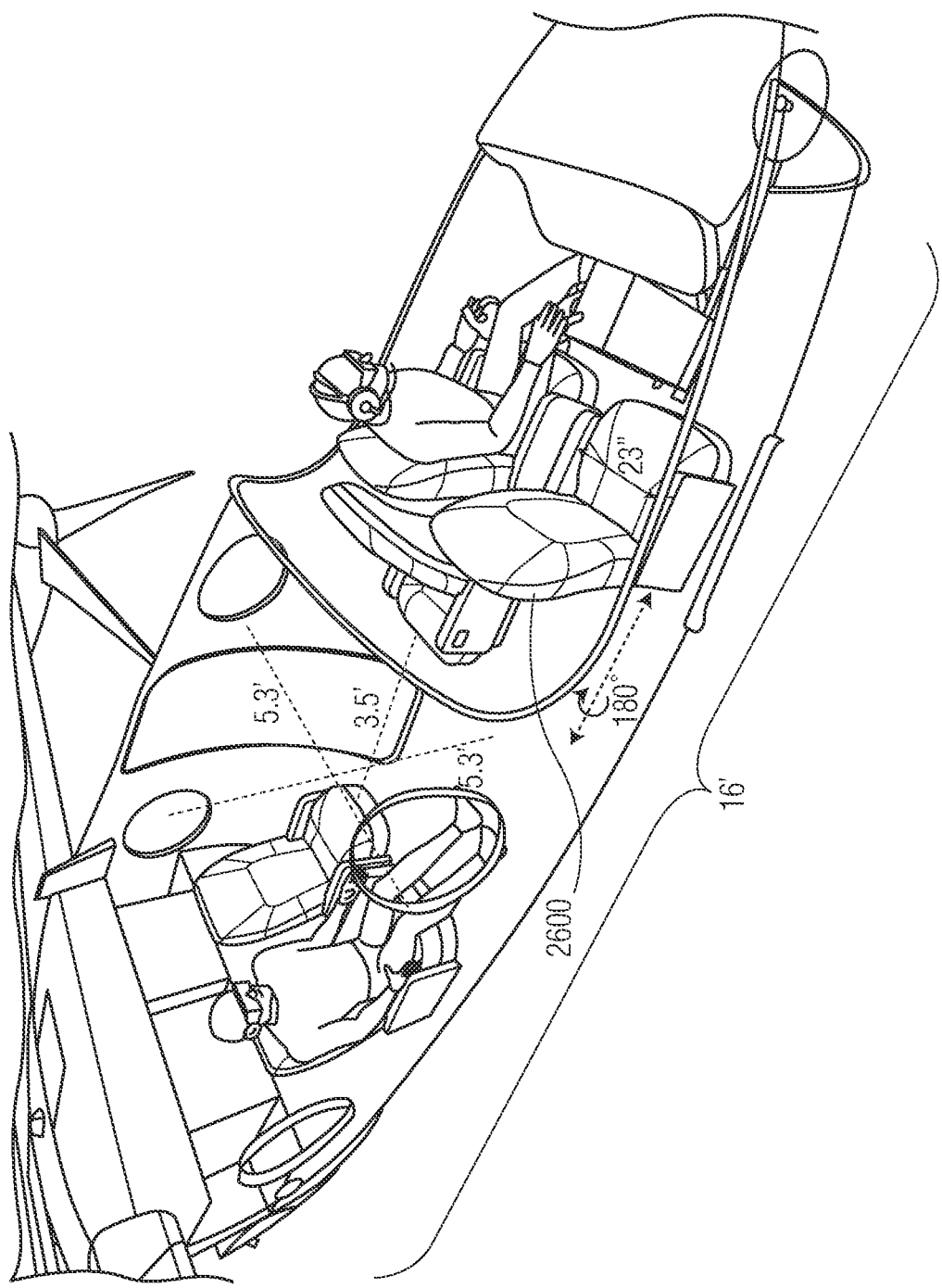
FIG. 26 shows the fuselage general layout, perspective view.
Figure 35:
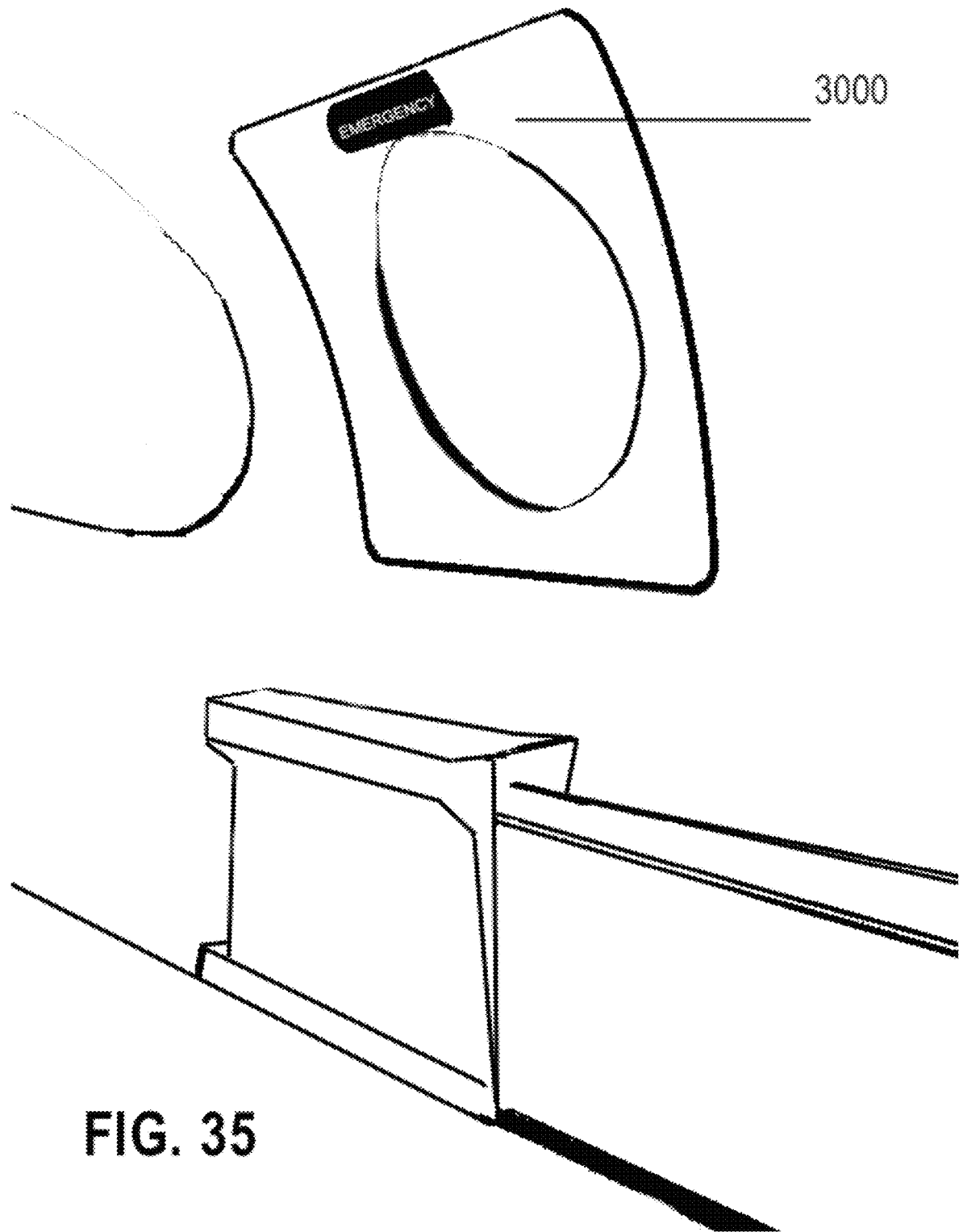
FIG. 35 is a perspective drawing of the emergency exit as viewed from the port rear passenger seat.
Figure 36:
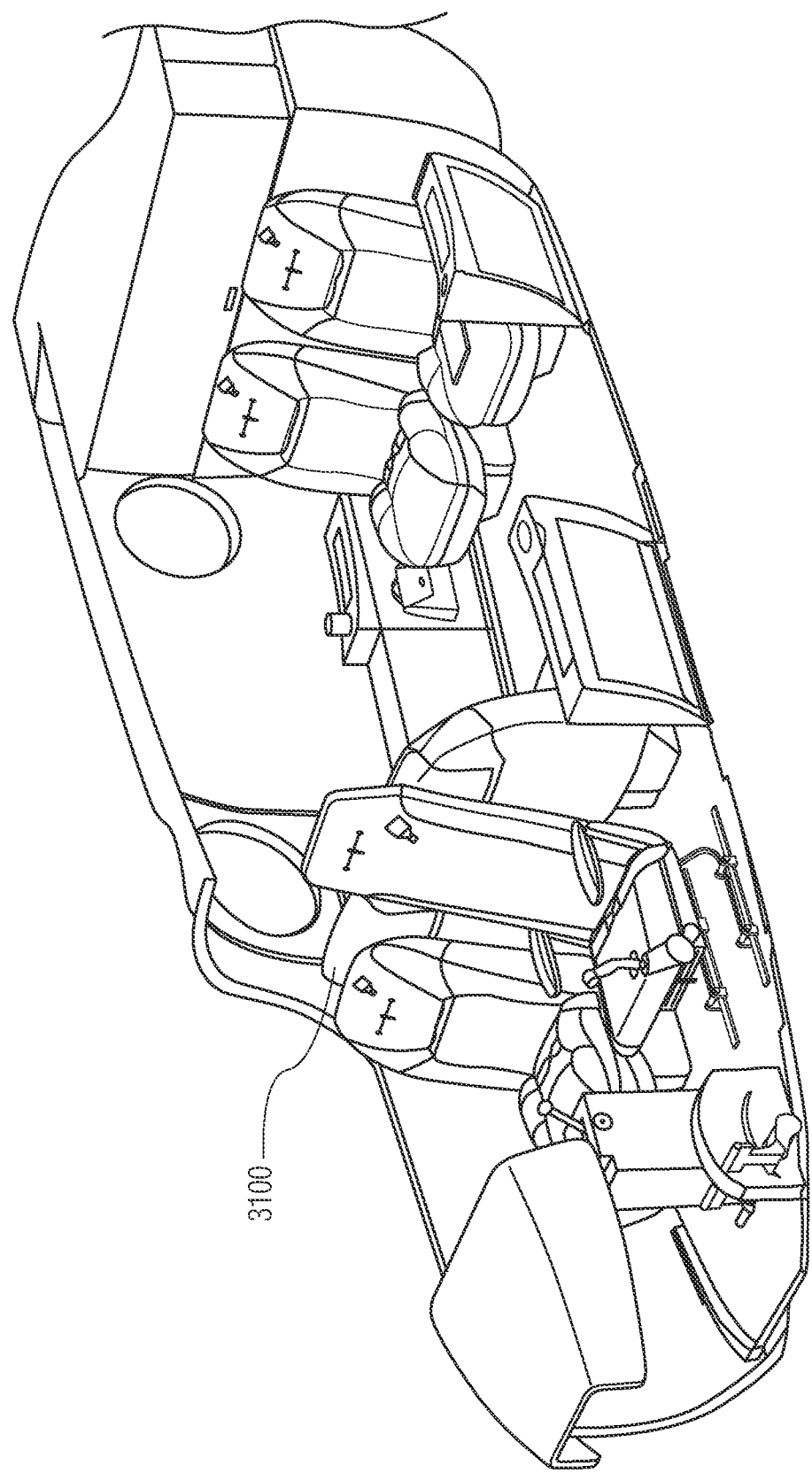
FIG. 36 is a perspective view of the interior showing the optionally installable sixth seat.

The cabin has metamaterial-based sound dampening; a split cabin door 155 that enables occupants to open just the top of the door, so that in case of ditching in water the fuselage is more likely to avoid flooding; referring also to FIG. 35, an emergency door 3000 on opposite side of the cabin from the main door located high enough so that in case of ditching in water the fuselage is more likely to avoid flooding; and a fire-resistant cabin interior. Referring also to FIG. 26, in addition the passenger cabin features a seat 2600 that may be rotated 180 degrees for forward-facing or rear-facing configurations; and referring to FIG. 36, an optionally installable sixth seat 3100 so that the aircraft can accommodate 1-6 occupants.

Fuselage.

The Vy 400 can be manufactured with carbon fiber, aluminum, or both.

The Vy 400 has a frangible hull with energy absorbing seats and restraints.

Drivetrain.

Figure 25:
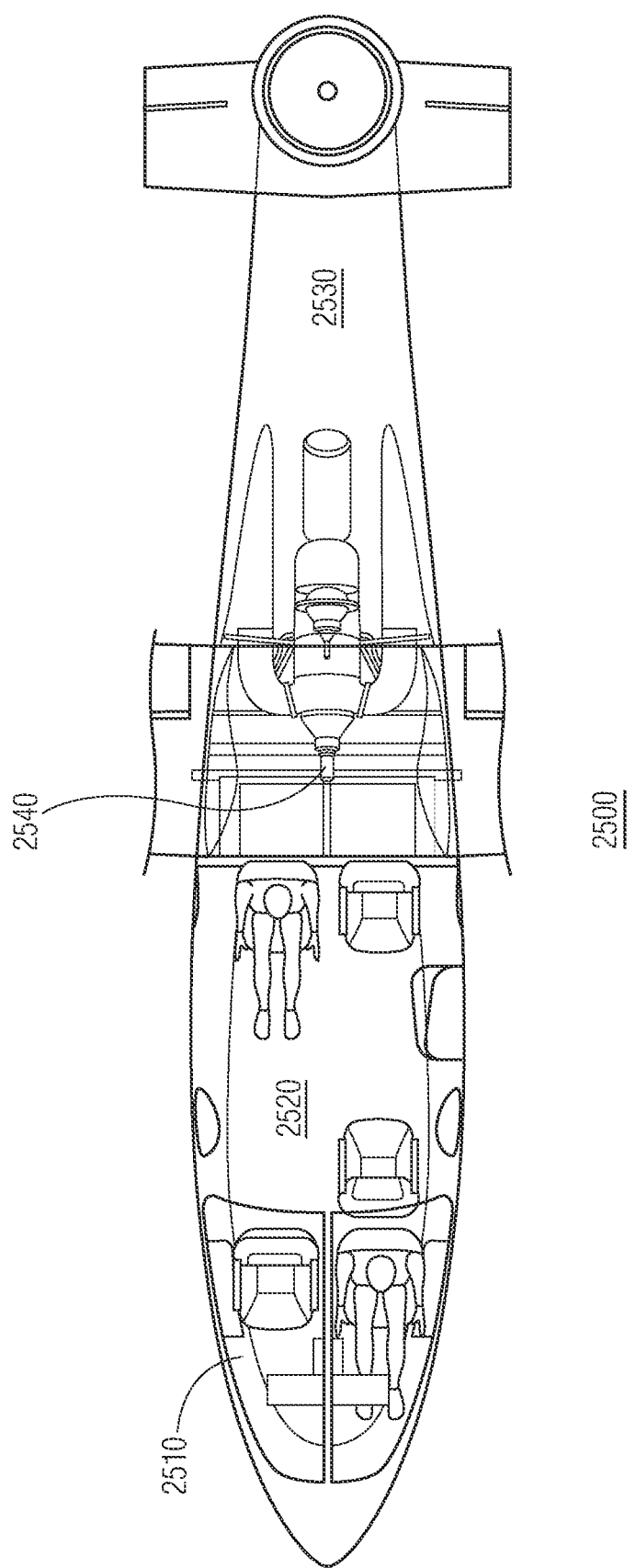
FIG. 25 shows the fuselage general layout, top view.
Figure 27:
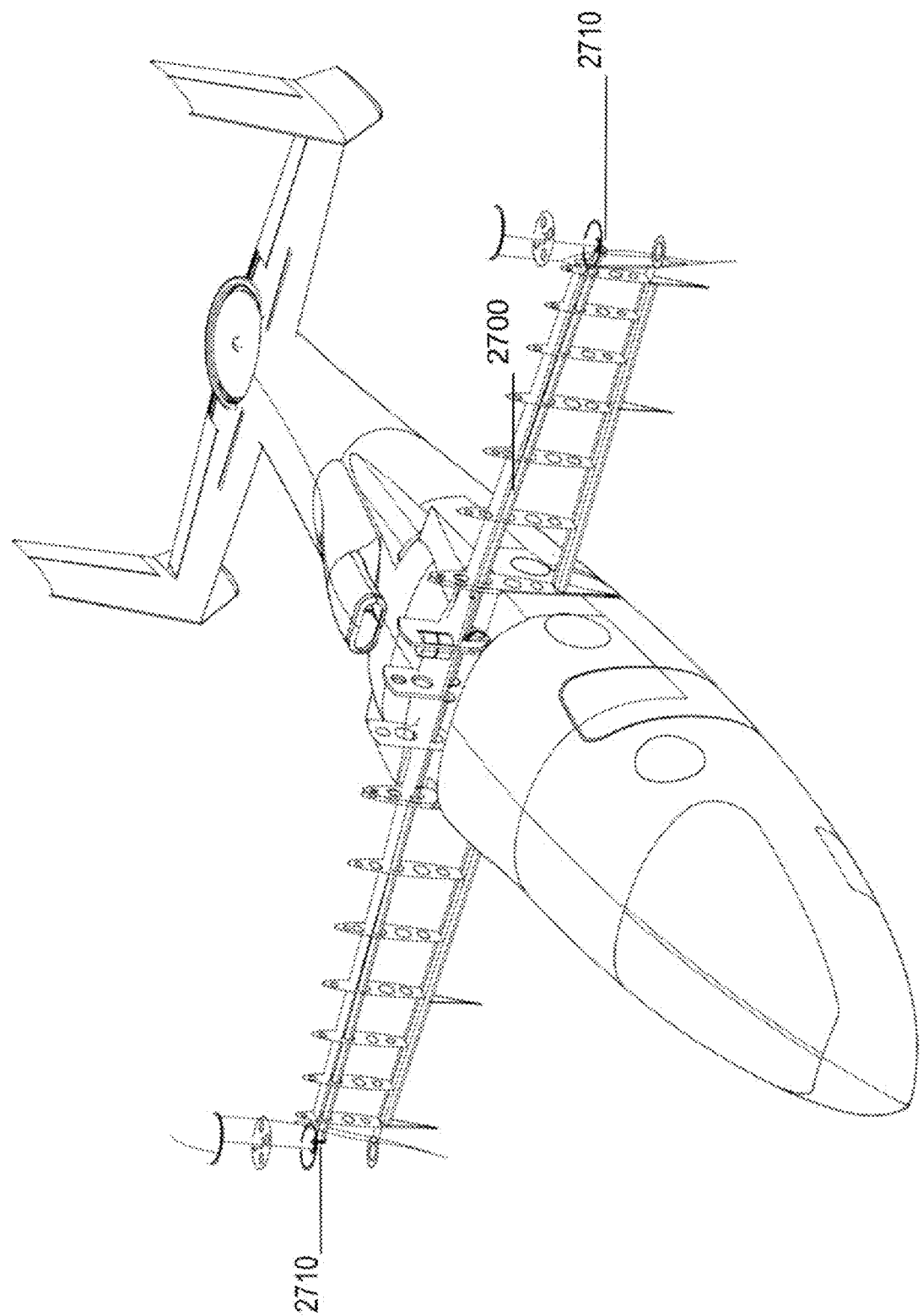
FIG. 27 shows the tilt-wing, perspective view.
Figure 28:
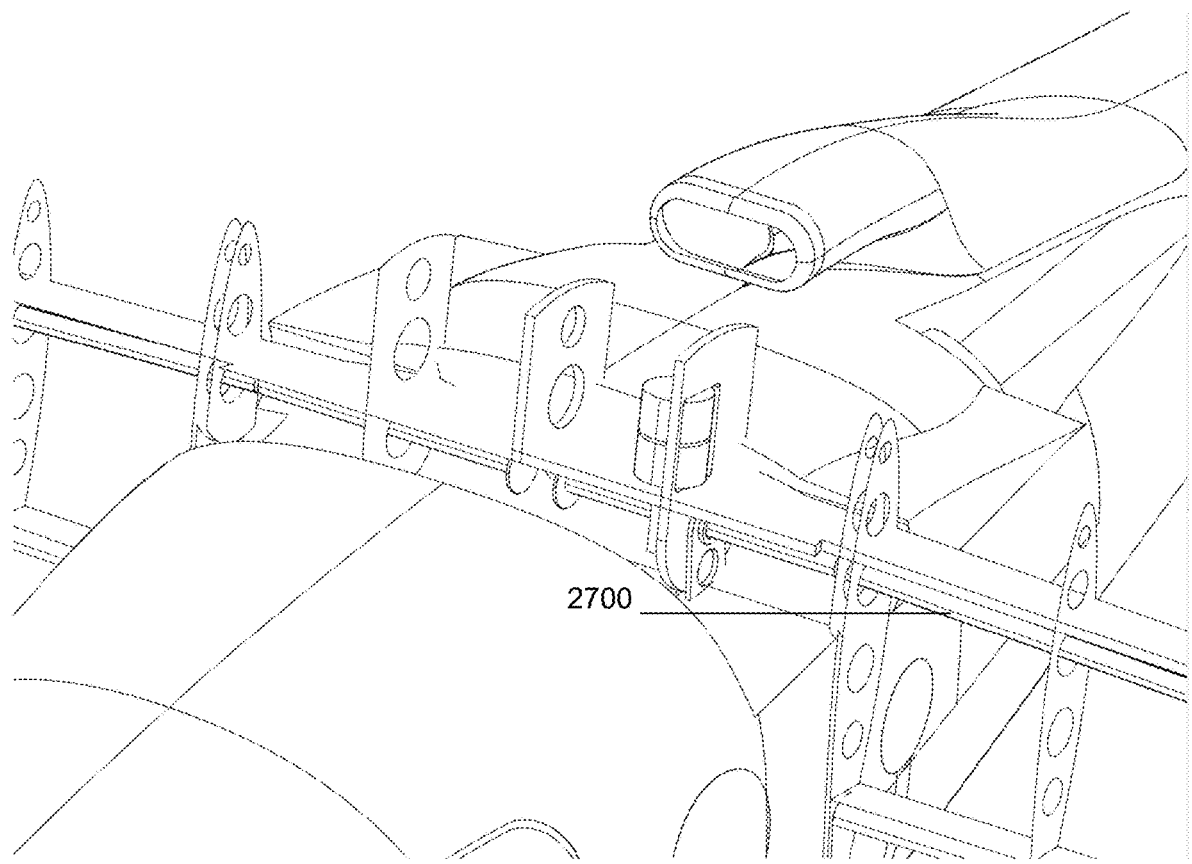
FIG. 28 shows the tilt-wing, close-up perspective view.
Figure 29:
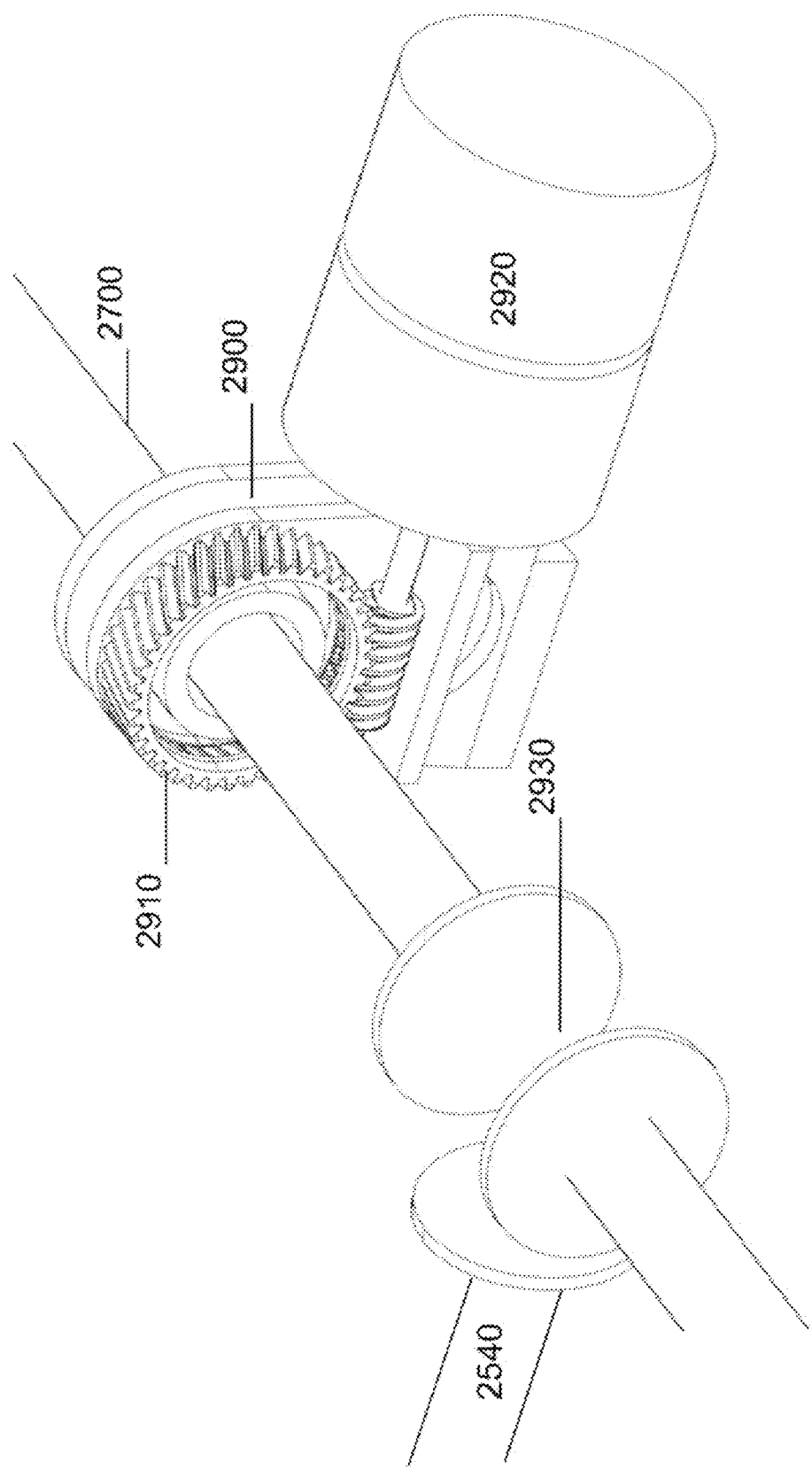
FIG. 29 shows the tilt-wing gear mechanism, perspective view.
Figure 30:
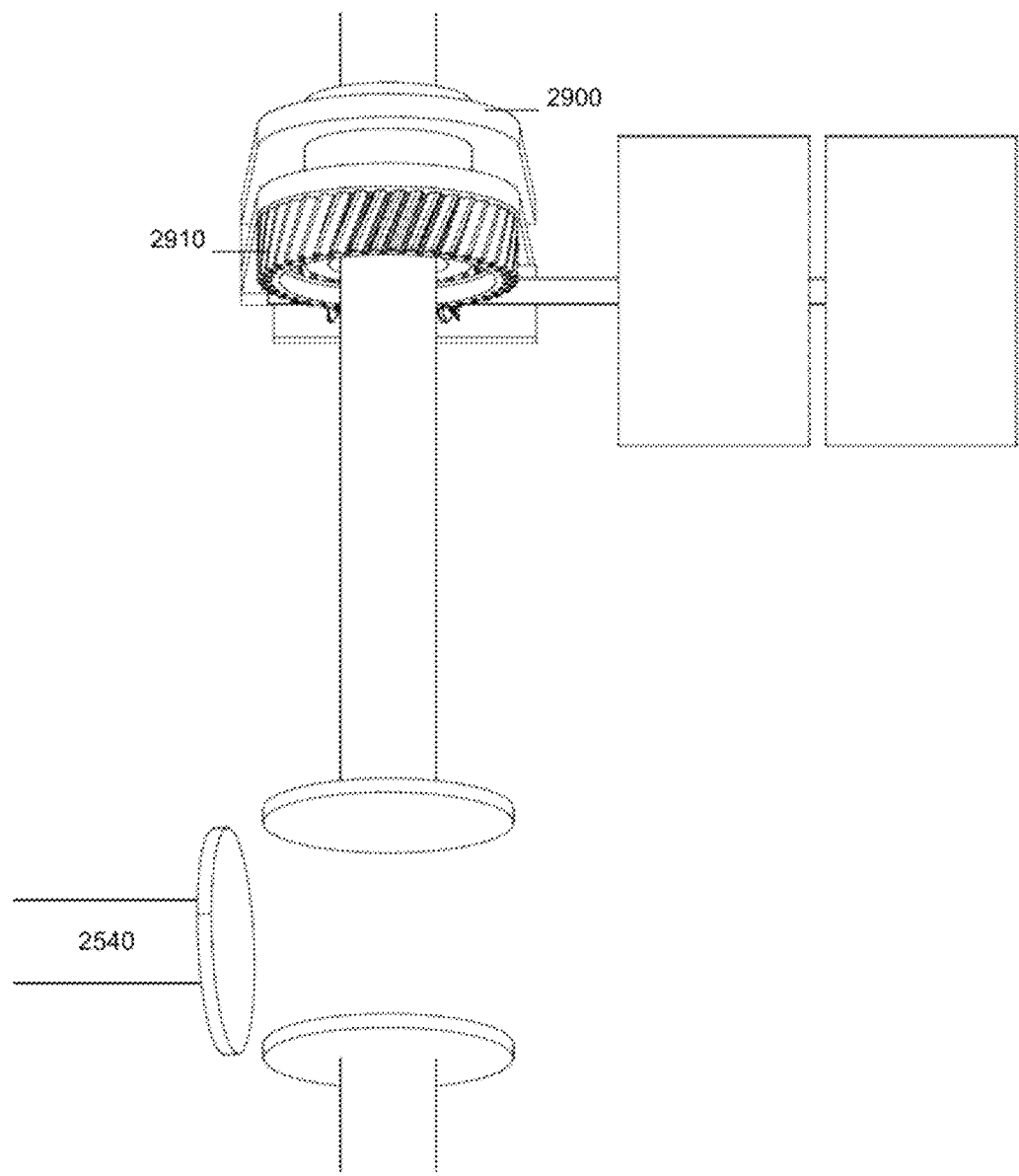
FIG. 30 shows the tilt-wing gear mechanism, left top view of the tilt-wing gear mechanism.
Figure 31:
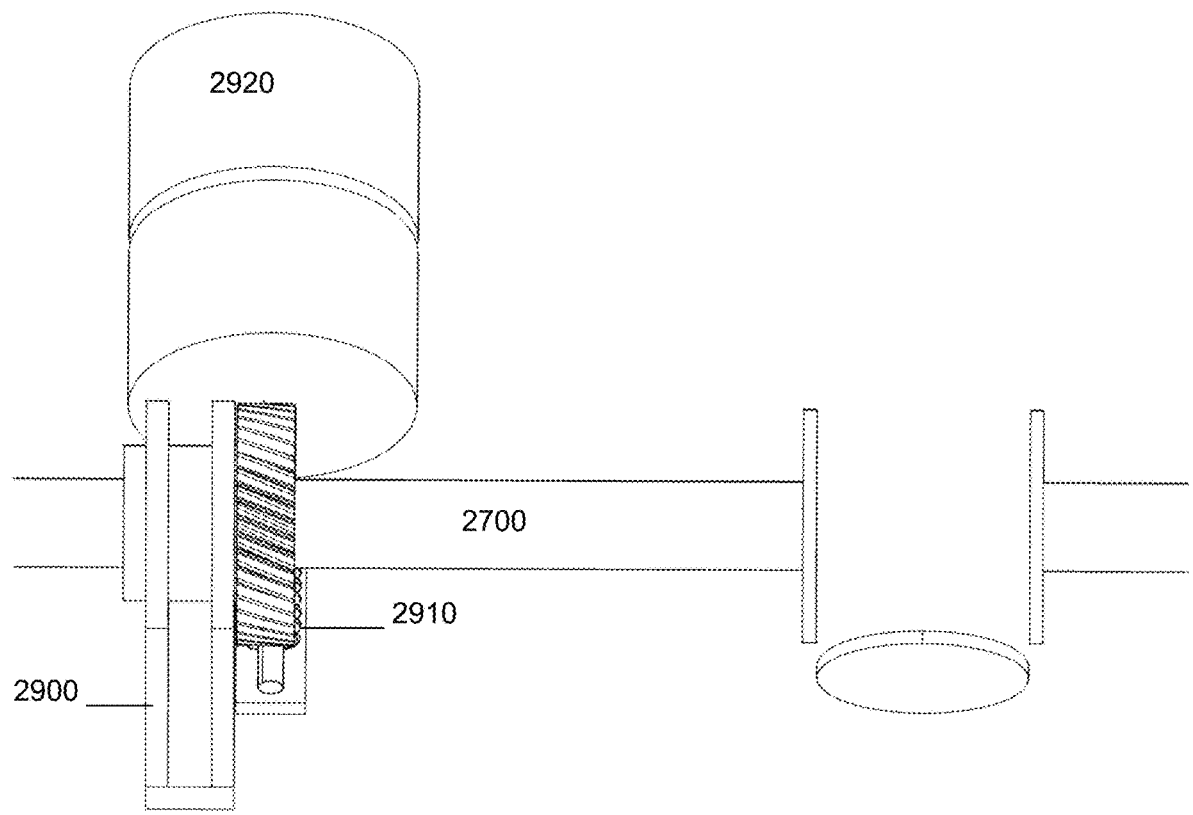
FIG. 31 shows the tilt-wing gear mechanism, front top view of the tilt-wing gear mechanism.
Figure 37:
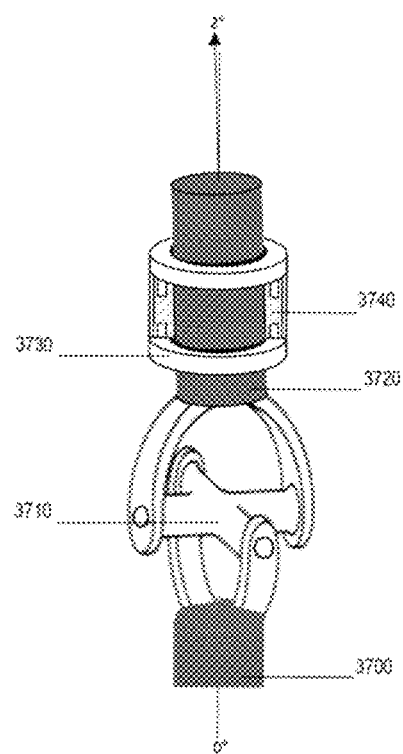
FIG. 37 is a cutaway drawing of the elastomeric main propeller drive shaft bearing and universal joint interface to the output of the L gearbox.

The Vy 400 uses a simplified mechanical drivetrain where, referring also to FIG. 25, the shaft 2540 from the PTEA engine is attached to a T gearbox that is centrally located in the wing. Also referring to FIG. 29, the T gearbox 2930 has as its output two driveshafts, each at an opposite 90 degree angle to the input shaft, one to power each propeller, and also reduces the rotation speed of the input shaft by one half. Referring also to FIG. 27, each propeller is served by an identical L gearbox 2710, with input from the wing shaft on its side, and output rotated 90 degrees. Referring also to FIG. 37, the output shaft from each L gearbox 3700 connects to a universal joint 3710, which itself is connected to a second shaft 3720 that rides within a circular bearing 3730 that is lined with an elastomer 3740 that enables the propeller to dissipate aerodynamic loads via compression of the elastomer.

Electrical.

The Vy 400 uses doubly redundant data and power busses for all electronics on aircraft. In some embodiments, these are based on based on time-division multiple access (TDMA) over Ethernet.

The Vy 400 uses dual redundant high power busses for the actuators, gear, and tilt mechanism.

The Vy 400 has secure datalinks that are separated from passenger entertainment systems.

Wings.

Referring also to FIG. 27 through FIG. 31, tilt-wing and tilt-wing gear mechanism.

The wing tilt mechanism makes the Vy 400 a tilt-wing, as opposed to tiltrotor, aircraft. The mechanism is space saving, reducing impingement of space on the main cabin. The mechanism employs an optimum design that doesn't generate damaging transient loads on failure.

A single wing with a tapered leading edge, tapered trailing edge, and anhedral chosen to position the propellers at the center of gravity in helicopter mode. The wing is notched in the center in such a way that it can rotate about an attachment at the top of the fuselage and the trailing portions of the wing on each side pass to either side of the cabin as the wing tilts from 0° of wing angle to its maximum of 120° of wing angle. The wing is strengthened by a box spar at the leading edge.

The wing is attached to the two trapeze mounts affixed on either side of the top of the fuselage. Each trapeze mount 2900 consists of a load-bearing structure that is roughly triangular with a rounded top. Near the top of each trapeze there is a circular hole, into which is affixed a bearing. Inserted into the bearings in both trapezes is a circular tube 2800 that is itself joined to the wing at multiple points such that, as the tube rotates within the trapeze bearings, the entire wing rotates and thereby effects its tilting.

The mechanism that causes the rotation employs a slew-ring worm drive that consists of a circular worm-wheel gear 2910 of slightly larger diameter than the wing tube that is attached to the port trapeze mount, encircling the wing tube. The worm wheel is thus attached to the fuselage at the trapeze. Engaging the worm-wheel is a zero-backlash worm gear. The worm gear is placed on a shaft that is driven by dual-redundant coaxial electric motors 2920. The motors and drive shaft are attached to the structure of the trailing section of the center portion of the wing in such a way that, as the motors drive the worm-gear in one direction, it engages the worm-wheel and drives around it, increasing the tilt angle of the wing. If driven in the other direction, the worm gear drives around the worm-wheel in the other direction, thereby decreasing the tilt angle of the wing. The zero-backlash nature of the worm-gear ensures there are no uncommanded changes in wing angle when the electric motor(s) are started or stopped.

The Vy 400 achieves vertical flight control with standard flight control surfaces on the main wing and variable pitch propellers. The Vy 400 does not use helicopter-style cyclics, thereby reducing both complexity and cost.

Non-Wheeled Landing Gear.

The Vy 400 uses retractable landing gear. In some embodiments, it consists of gear legs with a non-slip footpad 150, two in the rear, one in the front. In other embodiments, it consists of helicopter-style skids that are skinned, which helps direct airflow when close to the ground in order to enhance low-level controllability. Having no wheels reduces weight and complexity.

Anti-Ice.

The Vy 400 uses electric anti-icing for flight into known icing (FIKI), thereby eliminating the need for an additional fluid management system for de-icing/anti-icing fluid.

Pressurization.

The Vy 400 uses a simple pressurization system capable of maintaining a cabin altitude of no more than 8,000 feet MSL at altitudes up to 20,000 feet MSL. The aircraft hull is designed to appropriately distribute the load from this internal pressure via a system of passive structures embedded in the skin and other members. Gaskets are used around all penetrations of the pressure vessel to minimize air leakage and quiet any noise therefrom.

Parachute.

The Vy 400 employs a BRS Aerospace (brsaerospace.com) whole-airframe parachute to ensure occupant safety and minimize risk to persons and property on the ground in the event the aircraft departs controlled flight for any reason. The parachute system can be activated by a command from the pilot given via the control panel; via the FCS itself when certain critical fault conditions are detected; and by any occupant of the aircraft via pulling a manual trigger handle. The use of the BRS parachute in the Vy 400 design also reduces certification requirements and therefore the cost, risk, and time to complete certification, thereby improving the value of the entire program for all stakeholders.

Other Embodiments

In another embodiment, the turbine engine, fuel tank, and mechanical drive train from engine to the propeller L-gearboxes are replaced by an electric drivetrain, namely an appropriate set of electric energy storage devices, electrical wires, and nacelle-mounted electric motors capable of providing similar power and torque to the propellers while providing similar flight range and operating costs.

As will also be apparent to those skilled in the art, FCS software encompasses alternate embodiments of the software program in which the functions of the system are performed by modules different than those shown in the figures and described above. The FCS software may operate in a serial or parallel fashion, or a combination of the two, without departing from the spirit or scope of the disclosure. The FCS software program may be written in one of several widely available programming languages, and the modules may be coded as subroutines, subsystems, or objects depending on the language chosen.

Furthermore, alternate embodiments that implement the FCS software in hardware, firmware, or a combination of both hardware and software, as well as distributing the modules in a different fashion will be apparent to those skilled in the art and are also within the scope of the disclosure.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A vertical take-off and landing (VTOL) tilt-wing aircraft comprising:
    a fuselage made of carbon fiber, aluminum, or both, the fuselage further comprising:
        a front section with cockpit;
        a middle section passenger cabin, the passenger cabin having a fire-resistant cabin interior;
        a tail section containing an engine and a fuel tank; and seating for up to 6 occupants;
    a horizontally mounted stabilizing propeller connected at a center of an end of the tail section;
    two horizontal stabilizers connected to the tail section on opposite sides of the horizontally mounted stabilizing propeller;
    two vertical stabilizers connected one to each horizontal stabilizer;
    a single wing rotatably coupled to the fuselage, the single wing having a tapered leading edge and a tapered trailing edge, the single wing notched in the center so that the single wing can rotate about an attachment at a top of the fuselage and trailing portions of the single wing on each side of the notch pass to either side of the middle section passenger cabin as the single wing tilts from 0 degree of wing angle to a maximum of 120 degrees of wing angle, wherein the attachment between the single wing and the fuselage comprises two trapeze mounts affixed on either side of the top of the fuselage, wherein each trapeze mount includes a circular hole with bearing affixed within, and wherein a circular tube inserted into the bearing is joined to the single wing such that as the circular tube rotates within the trapeze bearings, the single wing member rotates and alters the wing angle;
    a slew-ring worm drive controlling rotation of the circular tube, the slew-ring worm drive comprising a circular worm-wheel gear encircling the circular tube, the worm-wheel gear engaged to a zero-backlash worm gear, the worm gear placed on a shaft driven by dual-redundant coaxial electric motors;
    two wing propellers connected one to each end of the wing, each mechanically coupled along a drive path to the engine, wherein an input shaft from the engine is attached to a T gearbox centrally located in the single wing, and two wing shafts at opposite 90-degree angles to the input shaft attach the T gearbox to two L gearboxes, one L gearbox in each side of the single wing, and each L gearbox has an output shaft rotated 90 degrees from the connected wing shaft;
    landing skids or footpads which extend from the fuselage for takeoff and landing and retract flush with the fuselage during flight;
    wherein the wing propeller plane or rotation is approximately horizontal when in helicopter mode for takeoff and landing, and approximately vertical when in airplane mode during flight; and
    wherein the VTOL tilt-wing aircraft has a maximum takeoff weight of 6990 pounds, a cruise speed of at least 350 knots, and a maximum range of at least 500 miles.

2. The aircraft of claim 1, further comprising the passenger cabin having a split cabin door and an emergency door opposite the split cabin door.

3. The aircraft of claim 1, wherein each output shaft connects to a double universal joint which is connected to a second shaft riding within an elastomer lined circular bearing and connected to one of the wing propellers.

* * * * *